US012744577B2

(12) United States Patent
Ahmed et al.

(10) Patent No.: US 12,744,577 B2
(45) Date of Patent: Sep. 22, 2026

(54) PORT-GROUP SPECIFIC PRECODING PARAMETER SETS FOR CJT WITH M-TRP

(71) Applicant: Nokia Technologies Oy, Espoo (FI)

(72) Inventors: Rana Ahmed, Munich (DE); Filippo Tosato, Bures sur Yvette (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/847,549

(22) PCT Filed: Mar. 18, 2022

(86) PCT No.: PCT/EP2022/057131
§ 371 (c)(1),
(2) Date: Sep. 16, 2024

(87) PCT Pub. No.: WO2023/174551
PCT Pub. Date: Sep. 21, 2023

(65) Prior Publication Data
US 2025/0226865 A1 Jul. 10, 2025

(51) Int. Cl.
*H04L 1/02* (2006.01)
*H04B 7/06* (2006.01)
*H04L 5/00* (2006.01)

(52) U.S. Cl.
CPC ......... *H04B 7/0626* (2013.01); *H04B 7/0639* (2013.01); *H04L 5/0051* (2013.01)

(58) Field of Classification Search
CPC ..... H04L 25/0224; H04L 1/0026; H04L 1/06; H04B 7/0626; H04B 7/0617;
(Continued)

(56) References Cited

U.S. PATENT DOCUMENTS

2018/0034612 A1* 2/2018 Lin ..................... H04L 25/0224
2020/0336182 A1 10/2020 Faxer et al.
(Continued)

FOREIGN PATENT DOCUMENTS

WO 2022018672 A1 1/2022

OTHER PUBLICATIONS

International Search Report issued by the European Patent Office acting as the International Searching Authority in relation to International Application No. PCT/EP2022/057131 dated Nov. 3, 2022 (3 pages).
(Continued)

*Primary Examiner* — Khai Tran
(74) *Attorney, Agent, or Firm* — Carter, DeLuca & Farrell LLP

(57) ABSTRACT

A terminal device includes means for: receiving, from a network device, a port group configuration indicating at least two groups of antenna ports in a channel state information reference signal, CSI-RS, resource set including one or more CSI-RS resources, the at least two CSI-RS port groups being associated with at least two respective transmission reception points, TRPs, using coherent joint transmission, CJT, for downlink, DL, communication; receiving the one or more CSI-RS resources from the at least two TRPs having antenna ports belonging to the at least two respective CSI-RS port groups; determining, based on the one or more received CSI-RS resources, precoding parameters for DL precoding by the at least two respective TRPs, wherein said determining includes a separate determination of at least two port group-specific sets of precoding parameters specific to the at least two respective CSI-RS port groups.

16 Claims, 19 Drawing Sheets

(58) Field of Classification Search
CPC .... H04B 7/0408; H04B 7/0413; H04B 7/061; H04W 72/23; H04W 16/28
USPC ................................ 375/267, 260, 262, 299
See application file for complete search history.

(56) References Cited

U.S. PATENT DOCUMENTS

2020/0350967 A1* 11/2020 Xu ........................ H04L 5/0051
2023/0130732 A1* 4/2023 Ibrahim ............ H04W 72/0446 370/329
2024/0031100 A1* 1/2024 Hao ...................... H04L 5/0053

OTHER PUBLICATIONS

Written Opinion of the International Searching Authority issued by the European Patent Office acting as the International Searching Authority in relation to International Application No. PCT/EP2022/057131 dated Nov. 3, 2022 (8 pages).

* cited by examiner

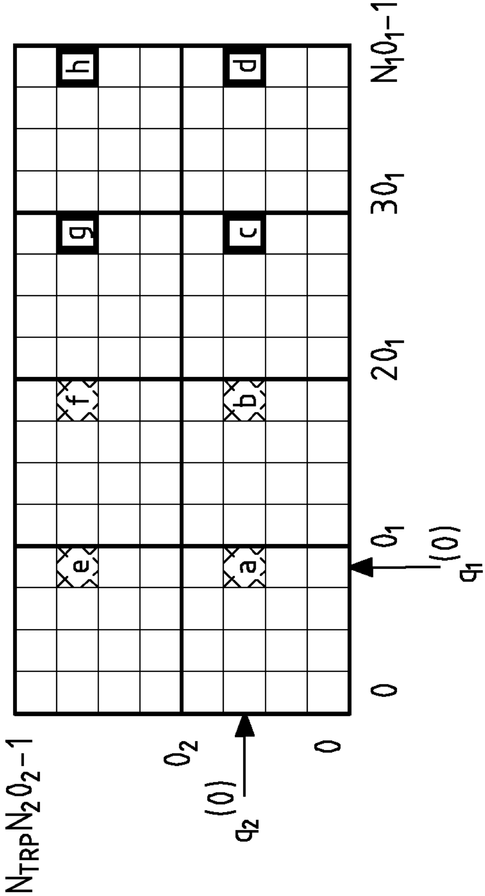
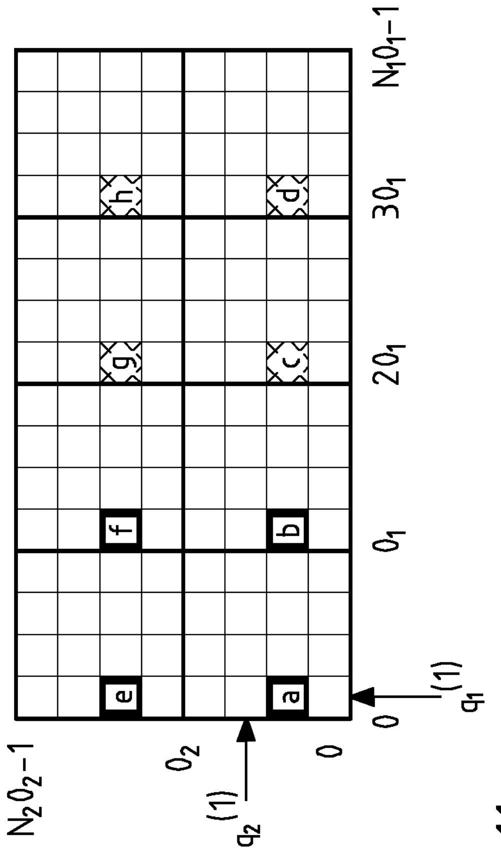
Fig.11
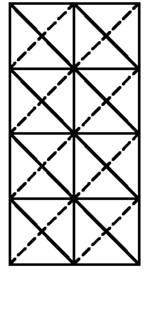
TRP 0
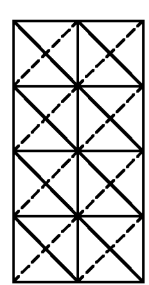
TRP 1

$W_1$

TRP 0 TRP 1 TRP 0 TRP 1

PORT-GROUP SPECIFIC PRECODING PARAMETER SETS FOR CJT WITH M-TRP

CROSS-REFERENCE TO RELATED APPLICATIONS

This application is a national phase entry under 35 U.S.C. 371 of PCT International Application No. PCT/EP2022/057131 filed Mar. 18, 2022, the disclosure of this application is expressly incorporated herein by reference in its entirety.

TECHNOLOGICAL FIELD

The present disclosure is related but not limited to communication networks as defined by the 3GPP standard, such as the 5G standard, also referred to as New Radio, NR. The disclosure in particular pertains the configuration for and determination and reporting of channel state information, CSI. More specifically, the disclosure can in particular be employed for coherent joint transmission, CJT, with multiple transmission reception points, M-TRPs.

BACKGROUND

In 3GPP Release 17, CSI enhancements for NR were introduced (see [1]). In 3GPP Release 18 work item description the MIMO evolution for downlink and uplink were further discussed (see [2]). Future codebooks in Release 18 may also include a compression in the Doppler/time domain (see [3]). As will become apparent from the following description, there remains the problem of improving channel estimation and reporting for CJT with M-TRPs.

SUMMARY OF SOME EXEMPLARY EMBODIMENTS

Certain embodiments of the disclosure may have the effect of an improved channel estimation and reporting for CJT with M-TRPs. More specifically, certain embodiments of the disclosure may have the effect of boosting the cell throughput performance in particular in cells with large number of users and distributed remote radio heads, RRH, or multi-panel/multi-TRP deployments. Certain embodiments of the disclosure may allow for extending advantages of Type II codebook support to multiple TRPs/panels under CJT measurement hypothesis and may allow configuring measurement on a single CSI-RS resource without need of CRI and with complexity comparable to a single-TRP CSI measurement with the same codebook type. Certain embodiments may allow extra flexibility in supporting TRPs/panels with different number of antenna ports. Certain embodiments may have the effect of supporting transmission from more than two TRPs/panels. Certain embodiments may have the effect that the UE can estimate the channel support for two (or more) sparse channels, which has better resilience against measurement noise.

According to a first exemplary aspect, there is disclosed a terminal device. The terminal device may comprise means for receiving, from a network device, a port group configuration indicating at least two groups of antenna ports in a channel state information reference signal, CSI-RS, resource set comprising one or more CSI-RS resources. The at least two CSI-RS port groups may be associated with at least two respective transmission reception points, TRPs. The TRPs may use coherent joint transmission, CJT, for downlink, DL, communication. The terminal device may comprise means for receiving the one or more CSI-RS resources from the at least two TRPs having antenna ports belonging to the at least two respective CSI-RS port groups. The terminal device may further comprise means for determining, based on the one or more received CSI-RS resources, precoding parameters for DL precoding by the at least two respective TRPs. Said determining may comprise separate determination of at least two port group-specific sets of precoding parameters specific to the at least two respective CSI-RS port groups. Said determining may comprise a joint determination of a common set of precoding parameters across the at least two CSI-RS port groups. The terminal device may further comprise means for transmitting, to the network device, a CSI report comprising precoding information indicative of the at least two determined port group-specific sets of precoding parameters and the determined common set of precoding parameters.

According to a second exemplary aspect, there is disclosed a network device. The network device may comprise means for transmitting, to a terminal device, a port group configuration indicating at least two groups of antenna ports in a channel state information reference signal, CSI-RS, resource set comprising one or more CSI-RS resources. The at least two CSI-RS port groups may be associated with at least two respective transmission reception points, TRPs. The TRPs may use coherent joint transmission, CJT, for downlink, DL, communication. The one or more CSI-RS resources may then be transmitted from the at least two TRPs with antenna ports belonging to the at least two respective CSI-RS port groups. The network device may e.g. comprise means for causing and/or controlling said transmission over the at least two TRPs. The network device may comprise means for receiving, from the terminal device, a CSI report comprising precoding information indicative of at least two port group-specific sets of precoding parameters and a common set of precoding parameters for DL precoding by the at least two respective TRPs. The at least two port group-specific sets of precoding parameters are separately determined specifically to the at least two respective CSI-RS port groups. The common set of precoding parameters is jointly determined across the at least two CSI-RS port groups.

According to each of the exemplary aspects, a respective method is also disclosed.

Thus, according to the first exemplary aspect, a method, at least performed by a terminal device, is also disclosed. The method may comprise receiving, from a network device, a port group configuration indicating at least two groups of antenna ports in a channel state information reference signal, CSI-RS, resource set comprising one or more CSI-RS resources. The at least two CSI-RS port groups may be associated with at least two respective transmission reception points, TRPs. The TRPs may use coherent joint transmission, CJT, for downlink, DL, communication. The method may further comprise receiving the one or more CSI-RS resources from the at least two TRPs having antenna ports belonging to the at least two respective CSI-RS port groups. The method may further comprise determining, based on the one or more received CSI-RS resources, precoding parameters for DL precoding by the at least two respective TRPs. Said determining may comprise a separate determination of at least two port group-specific sets of precoding parameters specific to the at least two respective CSI-RS port groups. Said determining may comprise a joint determination of a common set of precoding parameters across the at least two CSI-RS port groups. The method may further comprise transmitting, to the network device, a CSI report comprising precoding information indicative of the at least two determined port group-specific sets of precoding parameters and the determined common set of precoding parameters.

According to the second exemplary aspect, a method, at least performed by a network device, is also disclosed. The method may comprise transmitting, to a terminal device, a port group configuration indicating at least two groups of antenna ports in a channel state information reference signal, CSI-RS, resource set comprising one or more CSI-RS resources. The at least two CSI-RS port groups may be associated with at least two respective transmission reception points, TRPs. The TRPs may use coherent joint transmission, CJT, for downlink, DL, communication. The one or more CSI-RS resources are transmitted from the at least two TRPs with antenna ports belonging to the at least two respective CSI-RS port groups. The method may comprise receiving, from the terminal device, a CSI report comprising precoding information indicative of at least two port group-specific sets of precoding parameters and a common set of precoding parameters for DL precoding by the at least two respective TRPs. The at least two port group-specific sets of precoding parameters are separately determined specifically to the at least two respective CSI-RS port groups. The common set of precoding parameters is jointly determined across the at least two CSI-RS port groups.

Any of the disclosed device (terminal device, network device) may be stationary device or a mobile device. The terminal device may in particular be a user equipment, e.g. mobile device, such as a smartphone, a tablet, a wearable, a smartwatch, a low power device, an IoT device, an IIOT device or the like. The terminal device may in particular be capable of communicating with (transmitting and receiving data to/from) a network device, such as a base station of a communication network. Generally, the terminal device may also be any other device enabled for communication with a respective communication network, such as a vehicle, for instance a car, a truck, an airplane, a drone.

A network device may be understood as a wireless communication station installed at a fixed or mobile location and may in particular be or comprise an entity of the radio access network of the communication system. For instance, the network device may be, comprise, or be part of a base station of a communication network of any generation (e.g. a gNB, eNodeB, NodeB, BTS or the like) of 3GPP standard. Generally, the network device may be or comprise a hardware or software component implementing a certain functionality. In an example, the network device may be an entity as defined by 3GPP 5G or NR standard (also referred to as gNB). Accordingly, while the network device may be understood to be implemented in or be a single device or module, the network device may also be implemented across or comprise multiple devices or modules. As such, the network device may in particular be implemented in or be a stationary device. Multiple network devices of the exemplary aspect may in particular establish a communication system or network, which may in particular be a New Radio (NR) or 5G system (5GS) or any other mobile communications system defined by a past or future standard, in particular successors of the present 3GPP standards. The network device of the exemplary aspects may be capable of being in direct and/or indirect communication with the exemplary terminal device.

In general, the means or functionality of any of the disclosed devices or apparatuses (i.e. any of the terminal devices and network devices) can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to the respective exemplary aspects of the present disclosure, there is in each case also disclosed a respective apparatus (i.e. a terminal device and a network device) comprising at least one processor and at least one memory including computer program code, the at least one memory and the computer program code configured to, with the at least one processor, cause an apparatus at least to perform a method according to the respective aspect of the present disclosure.

Any of the above-disclosed exemplary aspects may, however, in general be performed by an apparatus, which may be a module or a component for a device, for example a chip. The disclosed apparatus may comprise the disclosed components, for instance means, processor, memory, or may further comprise one or more additional components.

According to the exemplary aspects of the present disclosure, there is in each case also disclosed a computer program, the computer program when executed by a processor of an apparatus causing said apparatus to perform a method according to the respective aspect.

The computer program may in each case be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

The port group configuration may in particular indicate to the terminal device how the TRP ports of each TRP map to the elements of a spatial beam. The port group configuration may, for instance, indicate the number of port groups, the number of antenna ports per port group (which may be the same for all or some port groups, but in general the number of ports per port group may be different), the arrangement of antenna ports within a respective port group (which may also be the same for all or some port groups, but may be different in general) and/or the polarization of respective antenna ports, just to name some examples.

Different TRPs may comprise or be realized by different remote radio heads, different panels and/or different antenna arrays, for instance.

That the at least two CSI-RS port groups as associated with respective transmission reception points, TRPs, may be understood to mean that a TRP comprises or uses a respective port group for CSI-RS transmission. In case of N TRPs there will preferably also be N CSI-RS port groups defined and indicated with the port group configuration. This association between a CSI-RS port group and a respective TRP may be achieved by configuring each CSI-RS port group in a separate CSI-RS resource of a CSI-RS resource set linked to a CSI reporting configuration. The association may also be achieved by configuring at least two CSI-RS port groups in a single CSI-RS resource of a CSI-RS resource set linked to a CSI reporting configuration. In the latter case a TCI (transmission configuration indication) state may be configured for each CSI-RS port group including a QCL (quasi co-location) type and QCL source. The association between a CSI-RS port group and a respective TRP may be used additionally for CQI (channel quality indicator) calculation to map PDSCH layers to CSI-RS port groups, such that PDSCH signals on antenna ports in the set [1000, . . . , 1000+v−1] for v layers would result in signals equivalent to corresponding symbols transmitted on antenna ports [3000, . . . , 3000+P−1] of at least two CSI-RS port groups, where P is the total number of ports across the at least two port groups.

The TRPs may be non-co-located. This may be understood to mean that the channel properties for signals from different TRPs are different and can in general not be assumed to be the same or sufficiently correlated in particular for the purpose of channel estimation. While multiple TRPs may usually be understood to be non-co-located, multiple panels may be understood to be co-located.

Coherent joint transmission can generally be understood to mean that the network has knowledge about the channels from the respective two or more TRPs involved in the joint transmission to the terminal device and selects transmission weights accordingly, for example, to focus the energy at the position of the terminal device. CJT transmission may in particular require that the involved TRPs or the port groups from the different TRPs collaborate together, i.e. are synchronized, in particular in phase as well as time. Thus, coherent joint transmission can be seen as a kind of beamforming for which the antennas taking part in the beamforming are not co-located and correspond to different transmission points.

As will be explained in more detail below, the CSI-RS resource set may comprise or be configured with only a single CSI-RS resource. The two or more TRPs in this case collaborate together such that the terminal device receives a single CSI-RS resource with a subset of the ports being transmitted from each TRP. In case of a single CSI-RS resource, this has the limitation that, if the number of ports per resource is equal to N (e.g. 32), each TRP can only have up to $N/N_{TRP}$ ports, with $N_{TRP}$ denoting the number of TRPs, and assuming that the N ports are equally distributed among the TRPs. The above described approach in particular allows extending in particular Type II codebook support to multiple TRPs under CJT measurement hypothesis, which in turn allows to configure measurement in particular on a single CSI-RS resource without the need of CRI and with complexity comparable to a single-TRP CSI measurement with the same codebook type. Moreover, supporting two or more port groups in a single CSI-RS resource allows additional flexibility in supporting TRPs with different number of Tx antenna ports, as will be described further below.

Nevertheless, as will also be explained in more detail below, the CSI-RS resource set may also comprise or be configured with multiple (e.g. $N_{TRP}$) resources. In this case a CSI-RS resource set may be configured with multiple (e.g. $N_{TRP}$) CSI-RS resources such that the signal received on each CSI-RS resource is transmitted from a different TRP. This approach allows support of more (in particular more than $N/N_{TRP}$) ports in total across the TRPs.

In either case, the terminal device will receive the one or more CSI-RS resources from the at least two TRPs having antenna ports belonging to the at least two respective CSI-RS port groups.

A determination of precoding parameters for DL precoding by the at least two respective TRPs may comprise a separate determination of at least two port group-specific sets of precoding parameters specific to the at least two respective CSI-RS port groups. In other words, a first port group-specific set of precoding parameters specific to the first CSI-RS port group is determined and a second port group-specific set of precoding parameters specific to the second CSI-RS port group is determined. In case of more TRPs, further port group specific sets of precoding parameters may be determined. The precoding parameters may for instance be components of a precoding matrix indicator, PMI. The precoding parameters may for instance be components of a PMI calculation for CJT CSI reporting with codebook Type II. A separate determination may in particular be understood as precoding parameters (e.g. PMI components) that are determined separately for (e.g. each of) the configured Port Groups/TRPs. As will be explained in more detail below, a set of selected spatial domain, SD, beams may be an example for a set of precoding parameters which is separately determined for each port group. A set of selected frequency domain, FD, basis may be another example for a set of precoding parameters which is separately determined for each port group. In other words, the respective sets of precoding parameters (such as selected SD beams and FD basis) are associated to individual Port Groups/TRPs.

The determination of precoding parameters for DL precoding may comprise a joint determination of a common set of precoding parameters across the at least two CSI-RS port groups. As with the separately determined port-group specific sets of precoding parameters, the precoding parameters may for instance be components of a precoding matrix indicator, PMI, and in particular components of a PMI calculation for CJT CSI reporting with codebook Type II. An example of a jointly determined set of precoding parameters are (linear) combination coefficients, LCC, for combining the separately determined sets of precoding parameters. For instance, the combination coefficients are determined jointly across the port groups/TRPs for each layer in order to obtain the precoding weights for a layer as a linear combination of SD beams and FD bases across the active TRPs.

A port group-specific set of precoding parameters (e.g., each of the at least two port group-specific set of precoding parameters) may in particular be determined by using CSI-RS measurements of a respective port group only. In contrast, a common set of precoding parameters across the at least two CSI-RS port groups may in particular be determined by using CSI-RS measurements of the at least two port groups. In case of more than two port groups, a common set of precoding parameters may be determined by using CSI-RS measurements of two or more of the port groups.

A CSI report comprising precoding information indicative of the determined port group-specific and common sets of precoding parameters. For instance, the port group-specific and common sets of precoding parameters may explicitly or implicitly be reported. The precoding parameters may also undergo further computations or lossless/lossy data compression before being reported. The precoding parameters may be reported separately or together. The precoding parameters may be reported, for instance, as vectors or matrices.

The network device may then use the received precoding information in order to construct a DL precoder at least based on said received precoding information.

The described approach enables a multi-TRP (e.g. a distributed remote radio head, RRH, a multi-panel or any other multi-TRP) setup in particular for Type II codebooks (including enhanced Type II codebooks and further enhanced Type II port selection codebook). These codebooks provide a more accurate PMI that allows to achieve higher throughput in both single- and multi-user MIMO DL transmission. Therefore, supporting Type II codebooks in multi-TRP/multi-panel transmission can boost cell throughput performance in cells with large number of users and distributed RRH or multi-panel/multi-TRP deployments.

Extending Type II codebooks support to CJT transmission has the additional advantage of supporting transmission from more than two TRPs/panels, whereas extending NCJT measurement and reporting of Rel. 17 to Type II codebooks may only be possible for two simultaneously transmitting TRPs.

The suggested approach considers that CSI components such as spatial domain components, frequency domain components, and/or doppler/time domain components are not the same across all antenna port groups with CJT. These components are chosen by the UE after measuring the estimated channel from the DL CSI-RS reference signals of the respective CSI-RS port groups so as to match or approximate the characteristics/properties of the respective channel, for example the spatial, frequency (delay) and doppler/time domain characteristics/properties of the communication channel.

With the prior knowledge at the UE terminal device side of the port groups, the terminal device can deal with estimating the channel support for at least two sparse channels, which has better resilience against measurement noise.

In the following, further exemplary features and exemplary embodiments of the different aspects of the present disclosure will be described in more detail.

The at least two port group-specific sets of precoding parameters may include, for a respective CSI-RS port group, a selection of spatial-domain basis components. The spatial domain basis components may for instance be spatial domain, SD, beams. The spatial domain basis components may for instance be DFT vectors of, or selected from, a (SD) codebook. For instance, the spatial domain basis components may be selected from a codebook, such as a DFT codebook. The selected spatial-domain basis component may be orthogonal. For instance, if L basis components are to be selected in total, L basis components or beams per TRP may be selected from an aggregated or non-aggregated codebook. Alternatively, $L_x$ (with $L_x \leq L$) basis components or beams may be selected per TRP from a non-aggregated codebook, such that the total number of selected basis components or beams amounts to L. Therein, the number of selected basis components may be the same or different for different TRPs. The selection of spatial-domain basis components may comprise or realized by indicating respective offsets in the array, e.g. with $q_1$ and $q_2$ denoting the offsets in the vertical and horizontal antenna array dimensions respectively for each TRP. The determined port group-specific sets of precoding parameters pertaining to the spatial domain may be contained in respective port-group specific matrices $W_2^{(x)}$ $$W_f^{(x)}$$

for respective port groups x. The port group-specific sets of precoding parameters pertaining to the spatial domain may also be combined in a (single) matrix $W_2$.

Additionally or alternatively, the at least two port group-specific sets of precoding parameters may include, for a respective CSI-RS port group, a selection of frequency-domain basis components. For instance, the terminal device may determine or select separate $M_x$ frequency domain, FD, basis components for each port group or TRP and for each layer. For instance, the determined port group-specific sets of precoding parameters pertaining to the frequency domain may be contained in respective port-group specific matrices $W_f^{(x)}$ for respective port groups x or a single matrix $W_f$.

Additionally or alternatively, the at least two port group-specific sets of precoding parameters may include, for a respective CSI-RS port group, a selection of time-domain basis components. For instance, the terminal device may determine or select separate time domain, TD, basis components for each port group or TRP and for each layer. For instance, the determined port group-specific sets of precoding parameters pertaining to the time domain may be contained in respective port-group specific matrices $W_D^{(x)}$ for respective port groups x or a single matrix $W_D$.

The common set of precoding parameters may include (e.g. linear) combination (or combining) coefficients of basis components. For instance, the combining coefficients provide for a weighted combination of selected basis components. For instance, the combination coefficients may provide for a weighted combination of the columns of the spatial domain matrix $W_1$. For instance, the combination coefficients are provided as a linear combination subband matrix $W_2$, e.g. as defined in Rel. 15 (spanning L beams per polarization and $N_3$ frequency bands, i.e. having dimension $2L \times N_3$). For instance, the combination coefficients are provided as a frequency compressed combination subband matrix $W_2$, e.g. as defined in Rel. 16 (spanning L beams per polarization and M selected frequency basis, e.g. having dimension $2L \times M$, which may be determined based on a product of a matrix containing the combination coefficients of the selected basis components for the respective subbands (e.g. dimension $2L \times N_3$) and an FD compression matrix $W_f$ (e.g. dimension $N_3 \times M$)). For instance, the common set of precoding parameters across the at least two CSI-RS port groups includes non-zero combination coefficients applied to the selected basis components to form a subband precoder. For instance, the common set of precoding parameters across the at least two CSI-RS port groups includes non-zero combination coefficients applied to the selected CSI-RS ports to form a wideband or subband precoder.

The at least two CSI-RS port groups may be non-overlapping. In other words, the port groups do not contain ports from another port group or each port is unambiguously assigned to a single port group. Therein, as already mentioned, the respective port groups may in particular comprise the same or different number of ports.

The CSI-RS port groups may be configured via higher layer signaling, in particular RRC signaling. For instance the network device (such as a gNB) may host a central scheduler and may configure the terminal device and the at least two TRPs with respective CSI port groups for a CJT transmission.

As mentioned, the at least two port group-specific sets of precoding parameters may include a selection of (e.g. SD, FD or TD) basis components. A number of basis components in a port group-specific set of basis components selected for one CSI-RS port group may then differ from a number of basis components in another port group-specific set of basis components selected for another CSI-RS port group. While the same number of basis components may be selected for some or all CSI-RS port groups, the possibility of selecting different numbers of basis components for some or all CSI-RS port groups allows a higher degree of flexibility for selecting the most suitable basis components.

At least one TRP of the at least two TRPs has a different number of antenna ports than at least one other TRP of the at least two TRPs. While some or all TRPs may have the same number of antenna ports, the possibility of having different number of antenna ports for some or all TRPs allows a higher degree of flexibility for multi-TRP deployment. Specifically, as the number or arrangement of the antenna ports may be limited or restricted by hardware, the possibility of having different number of antenna ports provides new possibilities for CJT via various TRPs.

The separate determination of the at least two port group-specific sets of precoding parameters may comprise, for at least one domain, a determination of separate matrices, a respective separate matrix indicating basis components for a respective CSI-RS port group for the respective domain. For instance, for some or each of the CSI-RS port groups or TRPs x, a separate matrix $W^{(x)}_1$ (for the spatial domain) or $W^{(x)}_f$ (for the frequency domain) or $W^{(x)}_D$ (for the Doppler/time domain) may be determined indicating basis components for a respective CSI-RS port group or TRP x.

As mentioned, the at least two port group-specific sets of precoding parameters may include a selection of spatial-domain basis components. The selection of spatial-domain basis components, for a respective CSI-RS port group, may then be based on a selection of one or more DFT-based spatial beams in one polarization of the respective port group (DFT-based codebook). For instance, the spatial beams may be based on DFT vectors, each DFT vector may correspond to a beam i of port group or TRP x. For the precoder, the DFT vectors of different port groups or TRPs may be combined into respective spatial beams with different phases (phase ramp across the subbands). The precoder (for a certain subband t) may for instance be based on L spatial beams $v_{i,x}$ based on DFT vectors corresponding to the i-th beam of port group/TRP x combined with a phase ramp across the subbands.

Alternatively, the selection of spatial-domain basis components, for a respective CSI-RS port group, may be based on a selection of one or more (beam-formed) CSI-RS ports in one polarization of the respective port group ($W_1$ may in this case be considered a port selection matrix).

As already mentioned, the at least two port group-specific sets of precoding parameters may include a selection of frequency-domain basis components. The frequency-domain basis components may be based on respective subband eigenvectors determined for each layer, wherein said determining of subband eigenvectors is done before or after a spatial compression. For instance, the strongest frequency domain components may be selected.

The port group configuration may indicate the at least two groups of antenna ports in a CSI-RS resource set comprising a single CSI-RS resource. In other words, there is one single multi-port CSI-RS resource with at least two sets of ports assigned to the at least two respective TRPs. Alternatively, the port group configuration may indicate the at least two groups of antenna ports in a CSI-RS resource set as being associated to at least two respective CSI-RS resources. Thus, there are at least two multi-port CSI-RS resources in a CSI resource set assigned to the at least two respective TRPs.

According to an embodiment of the described aspects (but also independent from the above described aspects and as a separate aspect of the present disclosure), the terminal device may comprise means for determining a first reference set of basis components for a first reference TRP of the at least two TRPs based on one or more received CSI-RS resources of a first CSI-RS port group of the at least two CSI-RS port groups. The terminal device may further comprise means for determining (at least) a second set of basis components for a second TRP of the at least two TRPs based on one or more received CSI-RS resources of a second CSI-RS port group of the at least two CSI-RS port groups. The terminal device may further comprise means for determining a cyclic shift or cyclic shift value to apply to the first reference set of basis components of the first TRP to derive the (at least) second set of basis components of the second TRP.

Accordingly, in a further aspect, there is also disclosed a terminal device comprising means for (and a respective method comprising):

- receiving, from a network device, a port group configuration indicating at least two groups of antenna ports in a channel state information reference signal, CSI-RS, resource set comprising one or more CSI-RS resources, the at least two CSI-RS port groups being associated with at least two respective transmission reception points, TRPs, using coherent joint transmission, CJT, for downlink, DL, communication;
- receiving the one or more CSI-RS resources from the at least two TRPs having antenna ports belonging to the at least two respective CSI-RS port groups;
- determining a first reference set of basis components for a first reference TRP of the at least two TRPs based on one or more received CSI-RS resources of a first CSI-RS port group of the at least two CSI-RS port groups;
- determining a second set of basis components for a second TRP of the at least two TRPs based on one or more received CSI-RS resources of a second CSI-RS port group of the at least two CSI-RS port groups; and
- determining a cyclic shift value to apply to the first reference set of basis components of the first TRP to derive the second set of basis components of the second TRP.

The precoding information of the CSI report transmitted to the network device may be indicative of the first reference set of basis components and the cyclic shift value. For instance, the first and second port group-specific sets of basis components comprise spatial-domain basis components, frequency-domain basis components and/or time-domain basis components. For instance, the amplitude profile of the second set of basis components specific to the second port group may be aligned to that of the reference set of the reference TRP. For the alignment, the terminal device may select the M strongest components.

This has the advantage of reducing reporting overhead, because not all of the sets of basis components for all of the port-groups have to be transmitted from the terminal device to the network device. Rather, only one (reference) set of precoding parameters and the respective cyclic shift(s) for the one or more other sets of basis components need to be reported. The network device can then derive the respective sets of basis components for the remaining port group(s) by means of the reference set of basis components and the reported cyclic shift(s).

More specifically, considering the example of FD basis components (however, the same applies to SD and TD basis components), the terminal device may first determine a first reference set of M FD basis components for a first reference TRP or first channel (out of the $N_3$ possible FD basis components) based on the received CSI-RS resources of the first CSI-RS port group. The terminal device may then determine a second set of M FD basis components for a second TRP or second channel based on the received CSI-RS resources of the second CSI-RS port group. The terminal device may then determine a cyclic shift value to apply to the first reference set of M FD basis components of the first TRP or first channel to derive (or at least approximate) the second set of M FD basis components of the second TRP or second channel. The UE may report precoding information to the network device indicative of the first reference set of FD basis component (i.e., the M selected basis components for the first TRP) and of the cyclic shift value, thereby achieving a lower CSI reporting overhead.

For instance, the cyclic shift may be a port group specific cyclic shift, i.e. a cyclic shift per port group (i.e. per TRP). In that case it needs to be reported, whereas if it was common across all ports, it would not need reporting.

In an example, the reference TRP (i.e. port group or resource) for each layer may be assumed to be the TRP with the strongest coefficient for that layer. For instance, this reference TRP may be determined by the strongest coefficient indicator (SCI). For instance, in Rel. 16 the position of strongest coefficient for a layer in the matrix $W_2$ (of size 2L×M) is indicated by its row index (with $\log_2(2L)$ bits), because it is always assumed to be in the first column. For instance, in Rel. 17 the position of strongest coefficient is indicated by its row and column index (with $\log_2(2LM)$ bits). So by knowing the number of beams L selected per TRP, one also knows which TRP has the strongest coefficient.

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 11 schematically illustrates similarly to FIG. 8 non-aggregated size-$N_1O_1N_2O_2$ codebooks for each TRP of a CJT setup with P=32 antenna ports and an array layout $(N_{TRP},N_1,N_2)=(2,4,2)$ with two polarizations and oversampling $(O_1,O_2)=(4,4)$, whereas in contrast to FIG. 8 the UE selects L=4 beams for each Port Group/TRP;

DETAILED DESCRIPTION OF THE FIGURES

Figure 1:
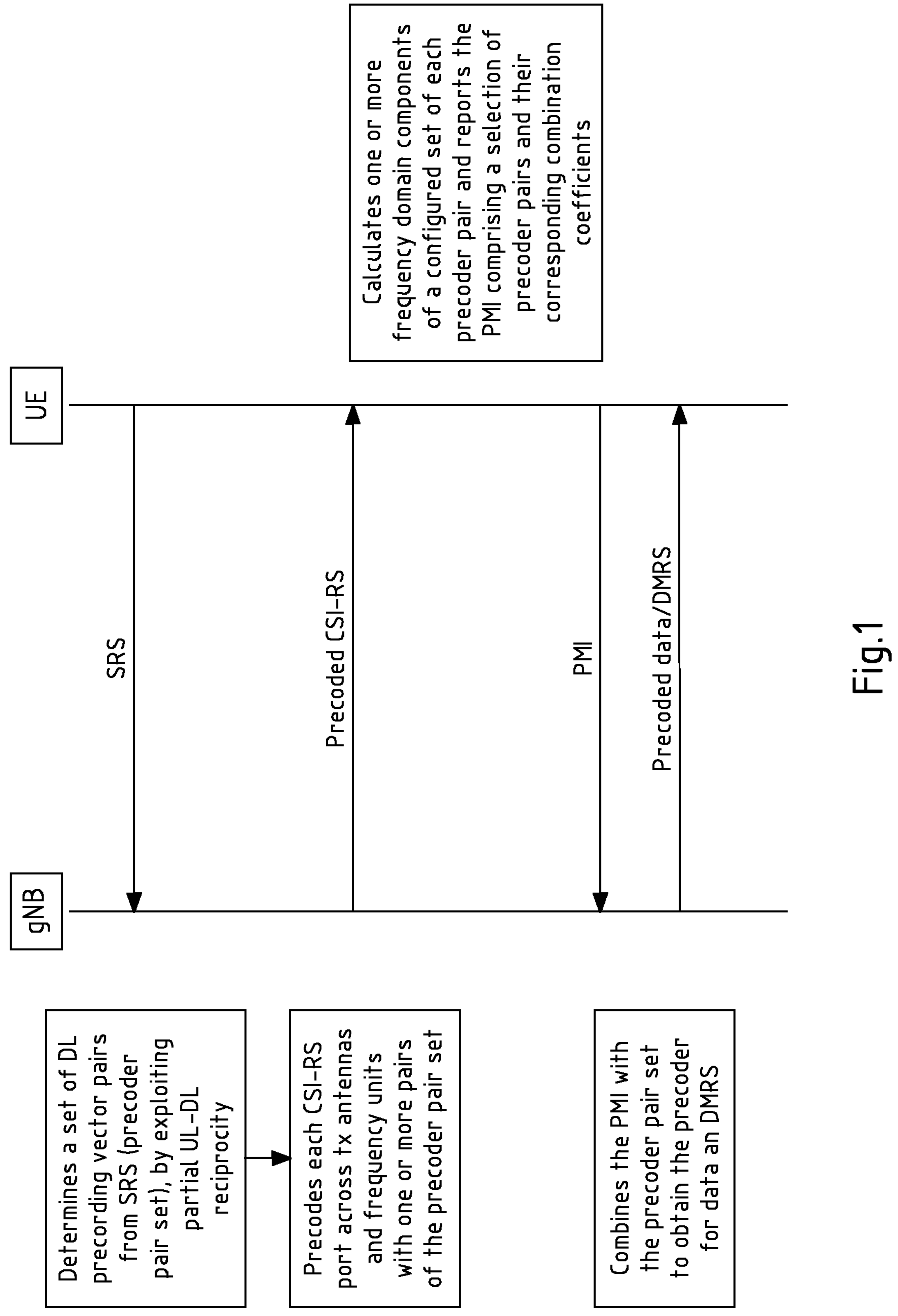
FIG. 1 shows a flow diagram illustrating a the determination and reporting of the PMI by the UE and the precoder construction at the gNB side according to the Rel. 17 framework.

The following description serves to deepen the understanding of the present disclosure and shall be understood to complement and be read together with the description of example embodiments of the present disclosure as provided in the above SUMMARY section of this specification.

In the following an, an example communication system, in which the present disclosure may be applied. While the specific radio system in the examples below is a 5G system, this is only to be considered a non-limiting example.

3GPP Release 17, introduces CSI enhancements for NR (see [1]). The description of the work item "Further enhancements on MIMO for NR" mentions enhancements on CSI measurement and reporting, and in particular the evaluation and specification of CSI reporting for DL multi-TRP and/or multi-panel transmission to enable more dynamic channel/interference hypotheses for NCJT, targeting both FR1 and FR2.

The scope of the work item in Rel.17 has covered non-coherent joint transmission (NCJT) in conjunction with single panel Type I codebook. Rel-17 has introduced support for multi-TRP CSI reporting with Type I single panel, by configuring the CSI-RS resources for channel measurement (a.k.a., CMRs) of a resource set in two Resource Groups and N=1 or 2 Resource Pairs with the first and second CMR in a pair associated to Group 1 and 2, respectively. The Resource Pairs configure NCJT measurement hypotheses, whereby a UE assumes that, for PDSCH transmission with $v=v_1+v_2$ layers, $v_1$ layers are transmitted on the $P_{CSI\text{-}RS}$ ports of TRP 1 and $v_2$ layers are transmitted on the $P_{CSI\text{-}RS}$ ports of TRP 2 and the two sets of layers overlap fully in time and frequency.

In 3GPP Release 18 work item description on MIMO evolution for downlink and uplink (see [2]), it was agreed to study, and if justified, specify enhancements of CSI acquisition for Coherent-JT targeting FR1 and up to 4 TRPs, assuming ideal backhaul and synchronization as well as the same number of antenna ports across TRPs, as follows:

Rel. 16/17 Type-II codebook refinement for CJT mTRP targeting FDD and its associated CSI reporting, taking into account throughput-overhead trade-off SRS enhancement to manage inter-TRP cross-SRS interference targeting TDD CJT via SRS capacity enhancement and/or interference randomization, with the constraints that 1) without consuming additional resources for SRS; 2) reuse existing SRS comb structure; 3) without new SRS root sequences Note: the maximum number of CSI-RS ports per resource remains the same as in Rel. 17, i.e. 32.

CJT vs. NCJT

Regarding NCJT, in 3GPP Release 17, for NCJT with M-TRP, the UE is configured to receive $K_s$ CSI-RS resources divided in two Resource Groups, with $K_1$ CMRs transmitted from a TRP in Group 1 and $K_2$ CMRs transmitted from a TRP in Group 2 and $K_1+K_2=K_s$. CSI feedback is provided by Type I single-panel codebook and comprises up to 3 different CSIs for each report, depending on the configuration, where a CSI can be associated to an NCJT or single-TRP measurement hypothesis depending on the corresponding CRI (CSI-RS resource indicator). In Rel. 17 MTRP CSI reporting, an NCJT transmission may have up to 4 layers transmitted by two TRPs with 4 possible reported rank combinations $\{v_1,v_2\}$: {1,1}, {1,2}, {2,1}, {2,2}, and a single codeword.

Conversely, in CJT, two or more TRPs/panels are assumed to be synchronized in time and phase such that each layer may be transmitted on the ports of more than one TRP/panel.

Background on Codebook Evolution in NR (from Rel. 15 to Rel. 17);

In Rel. 15 type II codebook, the precoding matrix, for each layer r=1, . . . , v, is written as $$W^r = W_1 W_2^r$$

The final precoder at the gNB is a weighted linear combination of L orthogonal beams per polarization where the grid-of-beam matrix $W_1$ is of size $2N_1N_2\times 2L$ and is built out of L orthogonal vectors/beams per polarization from a set of oversampled $O_1O_2N_1N_2$ DFT beams, where $N_1$ and $N_2$ are the number of antenna ports in horizontal and vertical domains. $O_1$ and $O_2$ are the oversampling factors in both dimensions. This collection of vectors can be used to approximate the eigenvectors of the channel covariance matrix by means of suitable weighted linear combinations.

This operation achieves a compression in the spatial domain (SD), hence the resulting 2L beams are also referred to as SD components.

Linear combination subband matrix $$W_2^r \text{ of size } 2L\times N_3,$$

where $N_3$ is the number of frequency subbands, which is used for the weighed linear combination of the columns of $W_1$ yielding the aforementioned approximation of the 1 strongest eigenvectors of the channel covariance matrix.

Enhancement of Type II (eType II) CSI feedback for Rel. 16 was agreed in 3GPP based on exploiting the frequency correlation inside $W_2$. A frequency domain compression scheme is applied on subband matrix $W_2$. The precoder for each layer r=1, . . . , v and across frequency-domain units W is derived as follows $$W^r = W_1 W_2^r W_f^{r^H}$$

where $$W_2^r \text{ is a } 2L\times M$$

matrix of linear combining coefficients, $$W_f^r \text{ is an } N_3\times M$$

FD compression matrix (analogous to $W_1$ in frequency domain), where M is the number of frequency domain (FD) components and the superscript H denotes Hermitian transposition (i.e. the transpose conjugate). In Rel.16 type II CSI, the UE feeds back to the gNB a grid-of-beam matrix $W_1$, FD basis subset $$W_f^r$$

and linear combination coefficients (LCC)

$$W_2^r.$$

. At the UE side, $$W_2^r$$

can be computed as $$W_2^r = W_2^{\prime r} W_f^r$$

where $$W_2^{\prime r}$$

is a matrix of size $2L \times N_3$, and it contains the subband combination coefficients as its columns.

In Rel. 17, a further enhanced Type II Port Selection (FeType II PS) codebook design was introduced, which exploits partial reciprocity of slow-fading components, i.e., angles and delays between the uplink and downlink channels in frequency division duplex (FDD) 5G systems. The gNB estimates the SD and FD components from the sounding reference signals (SRS) transmitted in uplink and precodes the CSI-RS ports across the transmit antennas and frequency units. A UE selects a subset of CSI-RS ports and reports fast-fading coefficients measured on the selected ports.

The assumed codebook structure is the same as for Rel16 eType II codebook, where the FD components are assumed common for all layers r=1, . . . , v $$W^r = W_1 W_2^r W_f^H$$

which can be rearranged as follows, by using well known matrix properties of the Kronecker product ⊗ and the vec(•) operator, which reshape a matrix as a vector by reading its elements first by row and then by column $$vec(W^r) = \left(W_f^* \otimes W_1\right) vec(W_2^r)$$

where (•* indicates conjugation. The new notation highlights how the SD precoding ($W_1$) and FD precoding ($W_f$) operations can be applied by the gNB to the CSI-RS as a single operation $$W_{joint} = W_f^* \otimes W_1.$$

Assuming existing knowledge of the delay information ($W_1$) as well as spatial information ($W_f$) at the gNB side from UL SRS, the Rel. 17 framework is comprised of three main steps which are listed here and are shown on FIG. 1:

1. At the gNB side, the CSI-RS ports are pre-coded across Tx antennas and frequency units with precoding vectors given by the columns of $W_{joint}$. Each precoding vector corresponds to one dominant beam direction and one significant delay tap and is applied to a port of the CSI-RS resource.
2. A UE calculates wideband measurements for each of the selected CSI-RS ports and feeds these back to the gNB. Hence the UE is spared from the effort of computing $W_f$ as required in Rel. 16, whilst the gNB can apply any spatial and frequency precoders to the CSI-RS ports, not having to be restricted by a codebook structure.
3. The gNB combines the CSI-RS precoder and UE feedback to form the precoder for DMRS and PDSCH data.

Future codebooks in Rel.18 may also include compression in the Doppler (time domain) (see [3]). This means the precoder equation for such a codebook may include a new $N_4 \times D$ time domain (TD) basis matrix, $W_D$, which handles the compression in the time direction and where $N_4$ denotes the total number of observations in time domain and D is the number of Doppler components. The final precoder equation can be written as $$vec(W^r) = \left(W_f^* \otimes W_D \otimes W_1\right) vec(W_2^r)$$

When extending the above Rel16/17 codebook structures to a CJT operation, some technical problems emerge.

Figure 2:
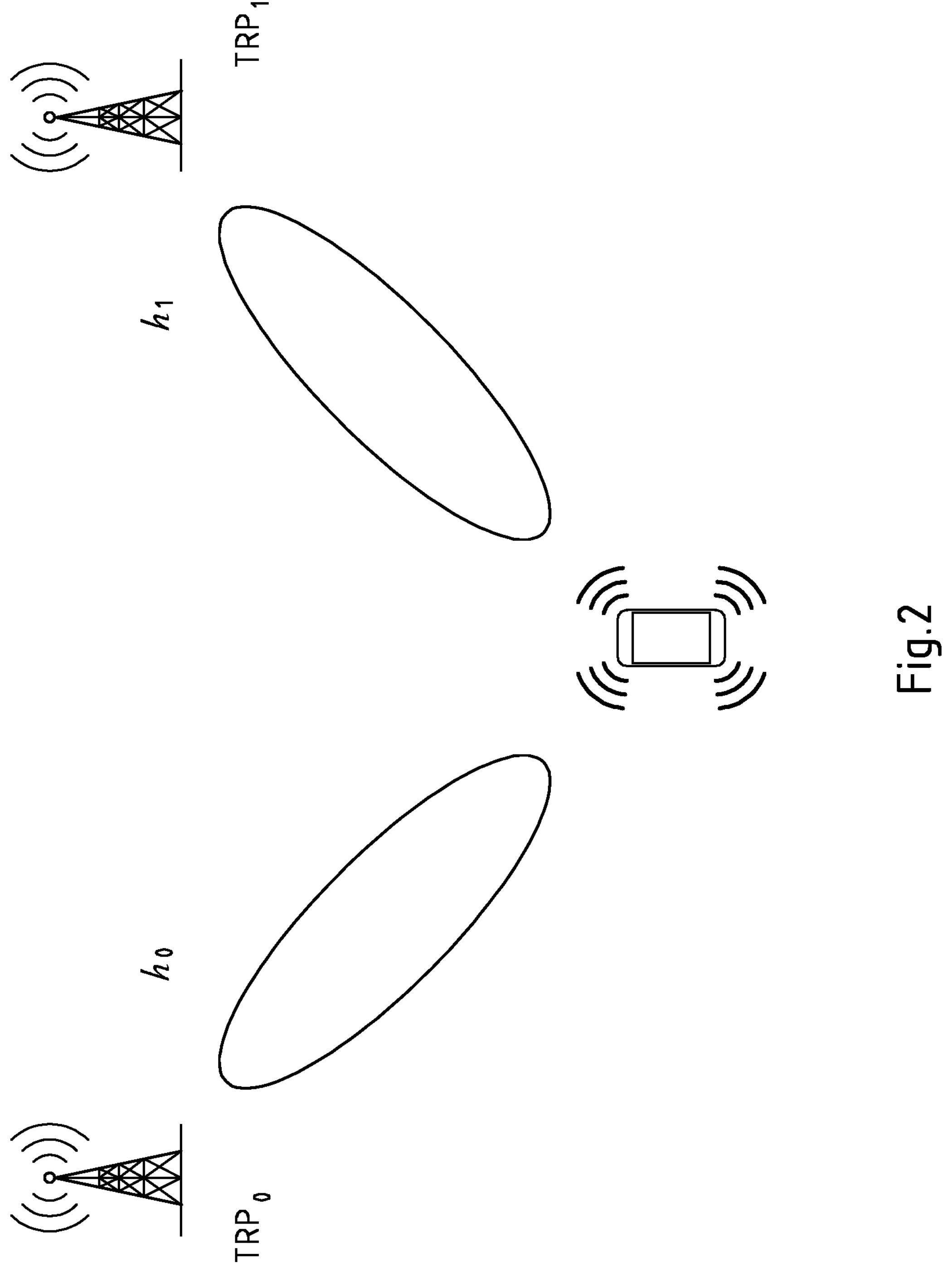
FIG. 2 a schematic illustration of a UE communicating with two TRPs, wherein the UE is going to observe part of its channel ports received through the first channel $h_0$ and the other subset of channel ports received through the second channel $h_1$.

It will be understood that, in CJT the UE will receive a combined DL transmission from two or more TRPs. So for example a UE communicating with two TRPs as shown in FIG. 2 is going to observe a subset of its channel ports transmitted by TRP 0 and received through the first channel $h_0$ and another subset of its channel ports transmitted by TRP 1 and received through the second channel $h_1$.

However, the codebook construction explained above assumes all transmit antenna ports are co-located in one panel and in one location. Accordingly, when the UE receives the pilots sent over the 2 channels: $h_0$ and $h_1$, a port common estimation of the basis functions would be enforced, which would suffer significantly against measurement noise because both channels are expected to have very different characteristics w.r.t. path loss and spatial, frequency, time behavior, etc. In other words, the UE would compute common codebook basis components $W_1$, $W_f$, $W_D$ for all ports of the CSI-RS resource(s) with possibly very different fading characteristics. For example, when estimating the dominant FD components, a UE may observe a non-sparse channel when considering all ports together. Besides, the complexity calculating all the CSI quantities jointly for all the CSI-RS ports transmitted by up to 4 TRPs is greatly increased and may be beyond a UE's hardware capability.

Figure 3:
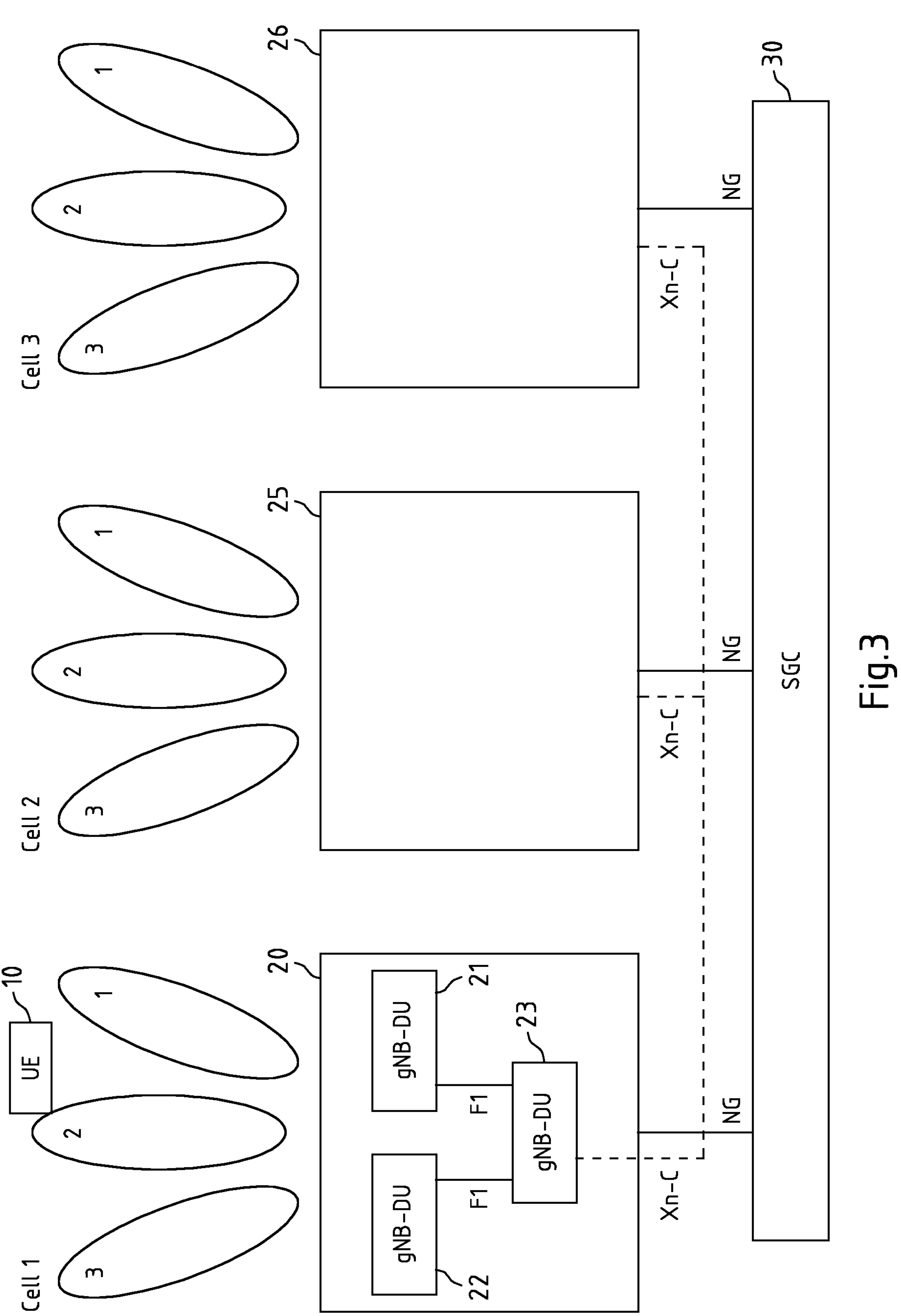
FIG. 3 shows a schematic diagram illustrating an example radio environment in which exemplary embodiments of the present disclosure may be performed.

FIG. 3 shows a 5G communication network, which introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as F1 interface). The DU is a logical node including a subset of the gNB functions, depending on the functional split option.

As shown in FIG. 3, a user equipment (UE) 10, as an example of a terminal device of the exemplary aspects of the present disclosure, is connected to a cell 1 of a network device or base station, a gNB 20 via a communication beam of the cell 1. In the example shown in FIG. 3, the gNB 20 is provided with a CU 23 and two DUs 21 and 22 being connected to the CU 23 by a F1 interface. Furthermore, as shown in the example of FIG. 3, there is a plurality of further cells to which the UE 10 can connect. Naturally, in each cell, a plurality of UEs may be present and connected to the respective cell. Similarly to cell 1, cells 2 and 3 are controlled by gNB 25 and 26, respectively, and each provides a plurality of beams 1 to 3. The different beams of a 5G network may be used for beam diversity or beam hopping.

As shown in FIG. 3, each base station or gNB of the cells is connected to a core network, such as a 5GC, via respective interfaces, indicated as NG interfaces. Furthermore, each gNB of the cells is connected with each other by means of a specific interface, which is referred to e.g. as an Xn-C interface. Any of these network entities, such as the gNB, gNB-DU, gNB-CU and/or 5GC, may individually or together be an example of a base station or a part thereof according to the present disclosure.

As will be explained in more detail below, the system as shown in FIG. 3 may enable communication to the UE 10 via multiple TRPs, which may be realized by different antenna arrays or panels (e.g. from different radio heads or base stations).

More specifically, let us consider a downlink single-DCI multi-TRP system in more detail. The system comprises $N_{TRP} \geq 2$ TRPs connected via an ideal backhaul link and transmitting coherently (CJT). We assume that all TRPs have the same array geometry, $N_1 \times N_2$, with $N_1$ antenna ports in azimuth and $N_2$ in elevation, for each of the two polarisations, and $2N_1N_2$ antenna ports in total per TRP. However, in general, different array geometries may also be used in the scope of the present disclosure.

Figure 4:
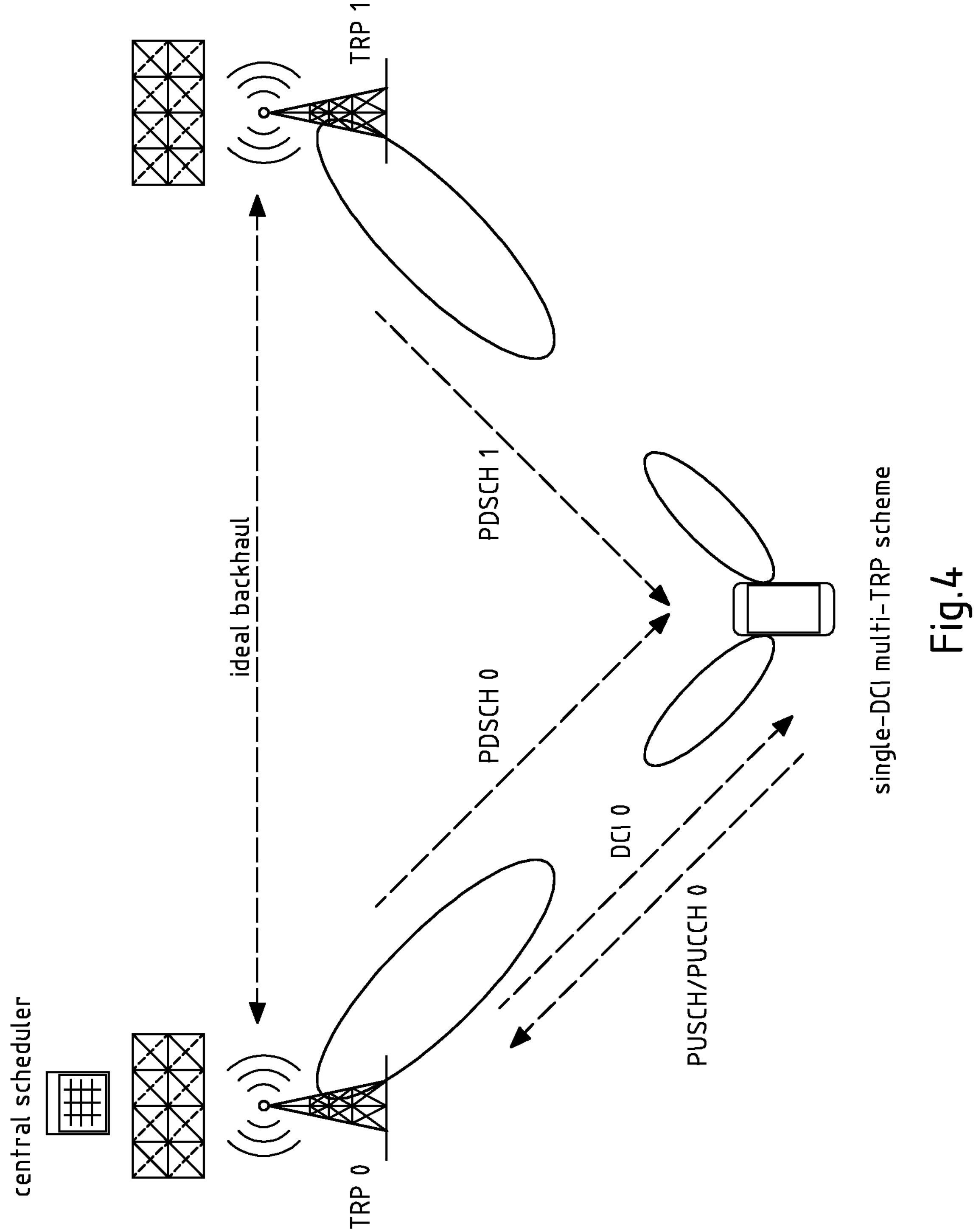
FIG. 4 shows a further schematic diagram illustrating an example radio environment with a single-DCI multi-TRP setup with two TRPs equipped with a 4×2 array each, in which the exemplary embodiments of the present disclosure may be employed.

An exemplary schematic diagram showing a single-DCI multi-TRP setup with two TRPs (TRP 0 and TRP 1) is illustrated in FIG. 4, where each TRP is equipped with a 4×2 array for each polarisation. However, as mentioned, the TRPs may in general also have different array geometries. One of the TRPs (here TRP 0) comprises a central scheduler. Each of the TRPs may have communication channels (such as PDSCH) established with the UE. Some communication channels may only be established between the UE and one of the TRPs (such as PDCCH/PUSCH/PUCCH channels).

The gNB hosting the central scheduler configures a UE with a Type II CSI report for a CJT transmission. In the following example, we describe the proposed changes to the CSI-RS resource setting and CSI calculation at the UE required for a UE to be able to calculate a Type II CSI for a CJT transmission hypothesis.

Resource Set Configuration and Port Group Definition

In the following exemplary details of the configuration of the resource set and the definition of the port groups will be provided.

In a legacy Rel. 15/16/17 Type II CSI report applicable to a single TRP, a CSI-RS Resource Set for channel measurement can only have a single resource with up to 32 ports, hence there is a natural mapping between the TRP ports and the elements of each of the L DFT vectors selected from the spatial domain (SD) codebook (we refer to such vector as a spatial beam, SD beam or SD basis component) and linearly combined to form a layer. However, in case of CJT a layer is obtained by a combination of L SD beams associated to one or more of the $N_{TRP}$ TRPs. Hence a UE needs to know how the TRP ports of each TRP map to the elements of a spatial beam. In general, a solution consists in associating the elements of the codebook vectors to a Port Group in the Resource Set. Hence a Resource Set for CJT Type II CSI reporting with $N_{TRP}$ TRPs needs to contain $N_{TRP}$ Port Groups of size $2N_1N_2$, defined e.g. in one of the following two ways.

1. A Port Group may be defined as a subset of ports in a single resource having $2N_{TRP}N_1N_2$ ports in total. In this case a new TCI (transmission configuration indicator) state may be introduced per Port Group with the QCL-type and QCL-source for each TRP/Port Group. Note that in legacy resource setting, a TCI state is defined per CSI-RS resource rather than per port. This solution has the limitation that, if the number of ports per resource is restricted to 32, each TRP can only have up to $32/N_{TRP}$ ports. For example, for $N_{TRP}=2$ TRPs, Port Group 1 comprises port indices from 0 to $2N_1N_2-1$ and the CSI-RS signals for Port Group 1 are transmitted from TRP 1. Port Group 2 comprises port indices from $2N_1N_2$ to $4N_1N_2-1$ and the CSI-RS signals for Port Group 2 are transmitted from TRP 2.
2. A Port Group may be implicitly associated to a CSI-RS resource. In this case a Resource Set can be configured with $N_{TRP}$ resources each with $2N_1N_2$ ports such that the CSI-RS signals for each CSI-RS resource are transmitted from a different TRP. In this case a single CJT CSI calculation may span across multiple or all resources in the set, i.e. this Resource Set configuration with multiple resources does not support CRI (CSI-RS resource indicator) reporting because all resources are used in one CSI calculation. This solution allows support of more than 32 ports in total across the TRPs.

In the PMI calculation for CJT CSI reporting with codebook Type II, we can distinguish between PMI components that are determined separately for the configured Port Groups/TRPs and jointly across the Port Groups/TRPs. In general, SD beams and FD bases are determined separately, in the sense that the selected SD beams and FD bases are associated to individual Port Groups/TRPs, whereas the combination coefficients are determined jointly across Port Groups/TRPs for each layer because the precoding weights for a layer are obtained as a linear combination of SD beams and FD bases across the active TRPs.

The determination of the separate SD and FD bases components is justified by the fact the TRPs are assumed, in general, to be non-co-located, hence the strongest beams and path delays are likely to be different for each TRP.

Note, however, that the determination of separate SD basis components may include the case in which the $N_1N_2$ beam weights associated to either polarisation of a TRP form a subset of a larger $N_{TRP}N_1N_2$-port beam drawn from a single DFT codebook of size $N_{TRP}N_1O_1N_2O_2$, where $O_1$ and $O_2$ are the oversampling factors in azimuth and elevation, respectively. Besides, these separate components may be mapped to a single indicator field in UCI.

SD Basis Components Determination

In the following exemplary methods of how the SD basis can be determined as an example of a separate determination of a port group-specific set of precoding parameters specific to the at least two respective CSI-RS port groups.

In legacy Type I/Type II CBS, all the selected SD basis components are transmitted from one TRP. In case of a TRP formed by multiple panels, for Type I multi-panel CB, the selected one or two beams are transmitted by all the panels in the TRP. This makes sense because the panels are assumed co-located within the same TRP.

In the proposed solution for CJT CSI calculation, a UE is configured to select separate SD beams for each TRP from a codebook, such as a DFT codebook. Hereafter, we provide examples of three different methods in which this operation can be configured.

1. Selection of L Beams Per TRP from an Aggregated Codebook (e.g. of Size $N_{TRP}N_1O_1N_2O_2$)

Figure 5:
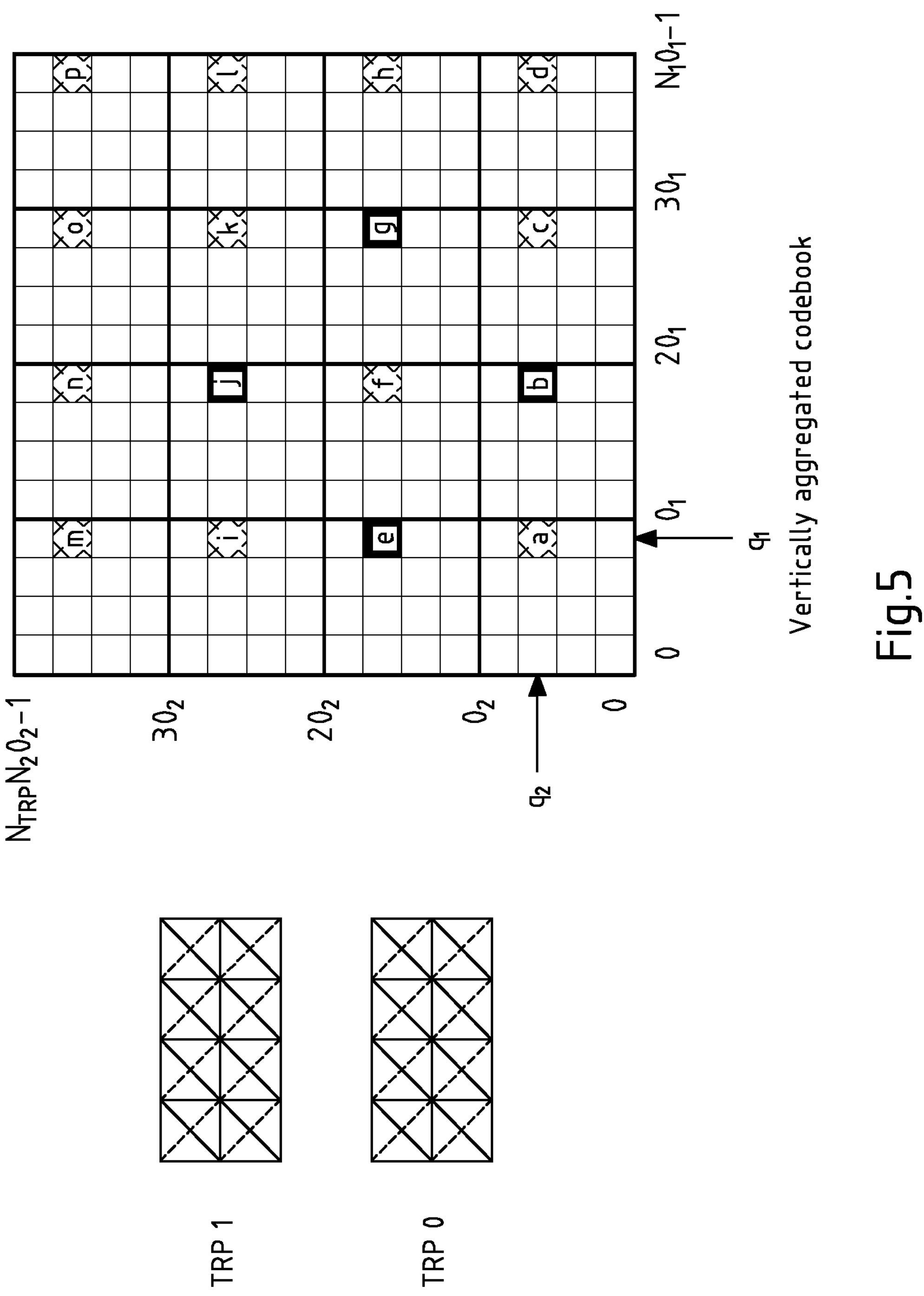
FIG. 5 schematically illustrates a vertically aggregated codebook for a CJT setup with P=32 antenna ports and an array layout $(N_{TRP},N_1,N_2)=(2,4,2)$ with two polarizations and oversampling $(O_1,O_2)=(4,4)$.
Figure 6:
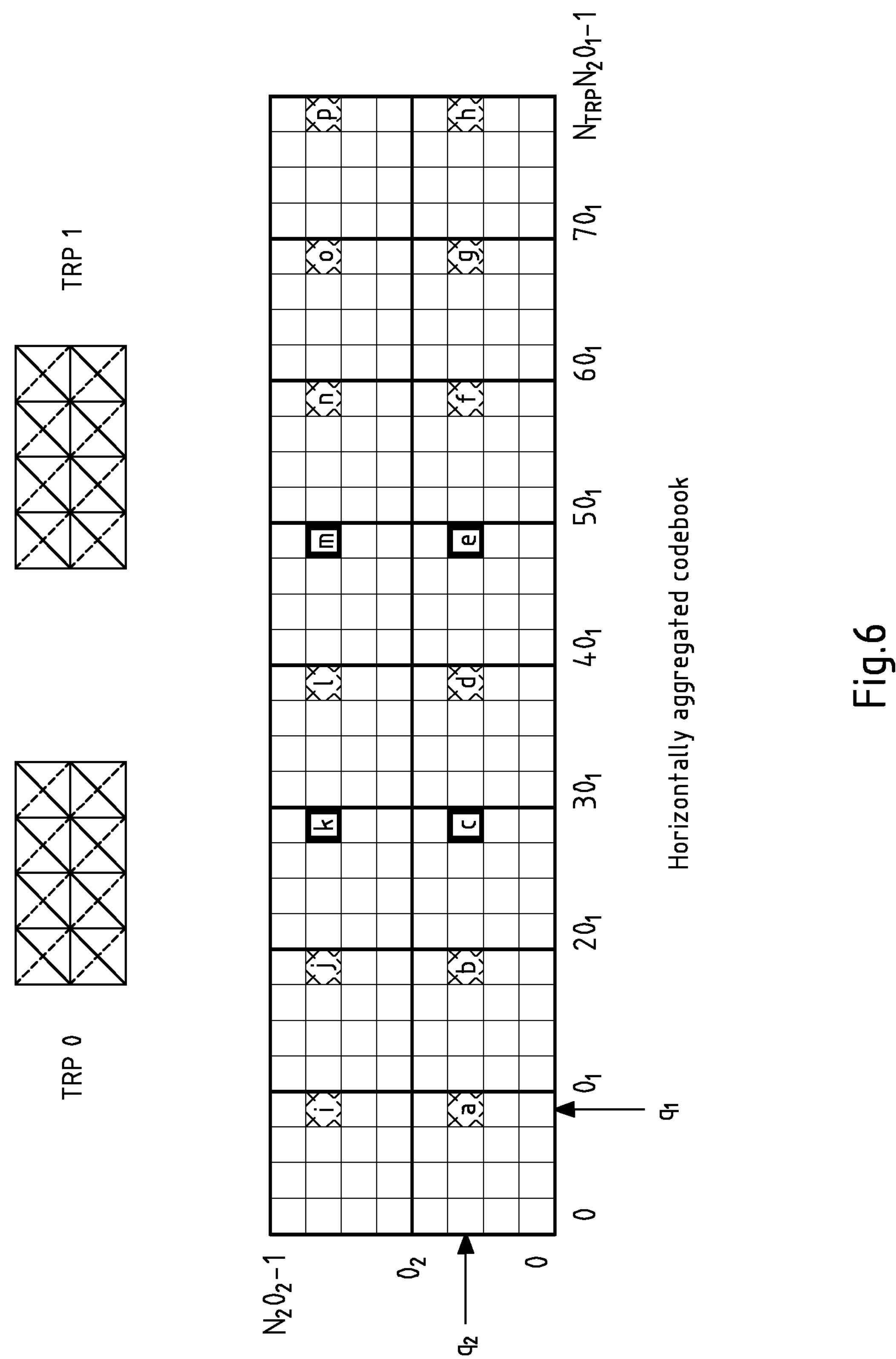
FIG. 6 schematically illustrates a horizontally aggregated codebook for a CJT setup with P=32 antenna ports and an array layout $(N_{TRP}, N_1,N_2)=(2,4,2)$ with two polarizations and oversampling $(O_1,O_2)=(4,4)$.

To illustrate this case, let us consider, as an example, a CJT setup with P=32 antenna ports and an array layout $(N_{TRP},N_1,N_2)=(2,4,2)$ and oversampling $(O_1,O_2)=(4,4)$. There are two possible SD codebook aggregations, one horizontal, along azimuth, to expand the codebook from size $N_1O_1$ to $N_{TRP}N_1O_1$, the other vertical along elevation, to expand the codebook from size $N_2O_2$ to $N_{TRP}N_2O_2$. The codebook aggregation increases the angular resolution in one of the two dimensions and results in narrower combined beams in the chosen dimension. FIGS. 5 and 6 show examples of vertically (FIG. 5) and horizontally (FIG. 6) aggregated codebooks, respectively.

In either case, for an oversampled DFT codebook, a UE may select the offsets $q_1 \in \{0, 1, \ldots, O_1-1\}$ and $q_2 \in \{0, 1, \ldots, O_2-1\}$, which determine the SD basis formed by $N_{TRP}N_1N_2$ orthogonal SD basis components. It may then select L components in the basis with indices $$n_1^{(i)}, n_2^{(i)}$$

for i=0, . . . , L−1. In case of vertical aggregation, $$n_1^{(i)} \in \{0, 1, \ldots, N_1-1\}, n_2^{(i)} \in \{0, 1, \ldots, N_{TRP}N_2-1\},$$

whereas, for horizontal aggregation, $$n_1^{(i)} \in \{0, 1, \ldots, N_{TRP}N_1-1\}, n_2^{(i)} \in \{0, 1, \ldots, N_2-1\}.$$

The i-th beam index can be identified by the pair $$\left(m_1^{(i)}, m_2^{(i)}\right), \text{ where } m_1^{(i)} = O_1 n_1^{(i)} + q_1 \text{ and } m_2^{(i)} = O_2 n_2^{(i)} + q_2.$$

We call $v_i$ the i-th beam selected from the aggregated codebook and $$v_i^{(x)}$$

the beam i for Port Group/TRP x, such that $$v_i = \begin{bmatrix} v_i^{(0)} \\ v_i^{(1)} \\ \vdots \\ v_i^{(N_{TRP}-1)} \end{bmatrix}$$

All the $$v_i^{(x)}$$

for a certain port group x can be considered to be a separately determined port group-specific set of precoding parameters specific to the CSI-RS port group x.

Figure 7:
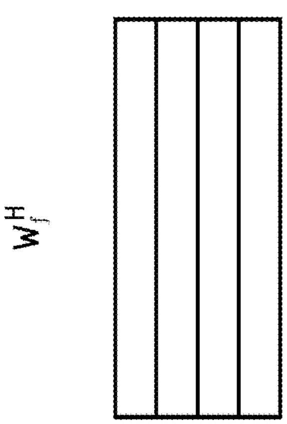
FIG. 7 shows how the L=4 SD beams selected from the aggregated codebook of FIGS. 5 and 6 are combined to form the precoder vector for a generic layer and all the subbands of the reporting band.
Figure 7:
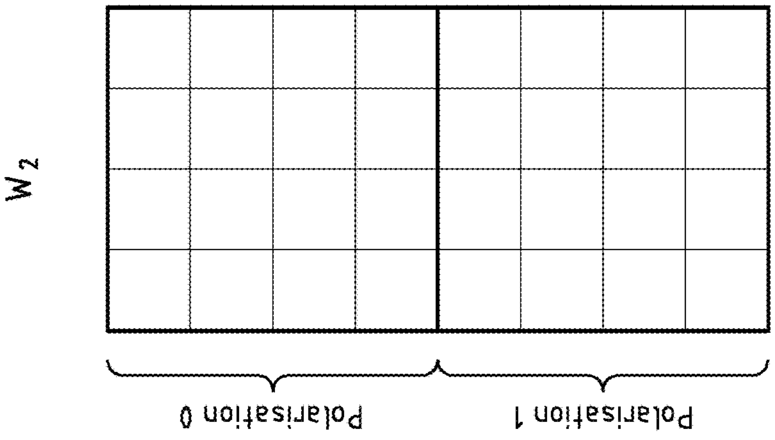
Figure 7:
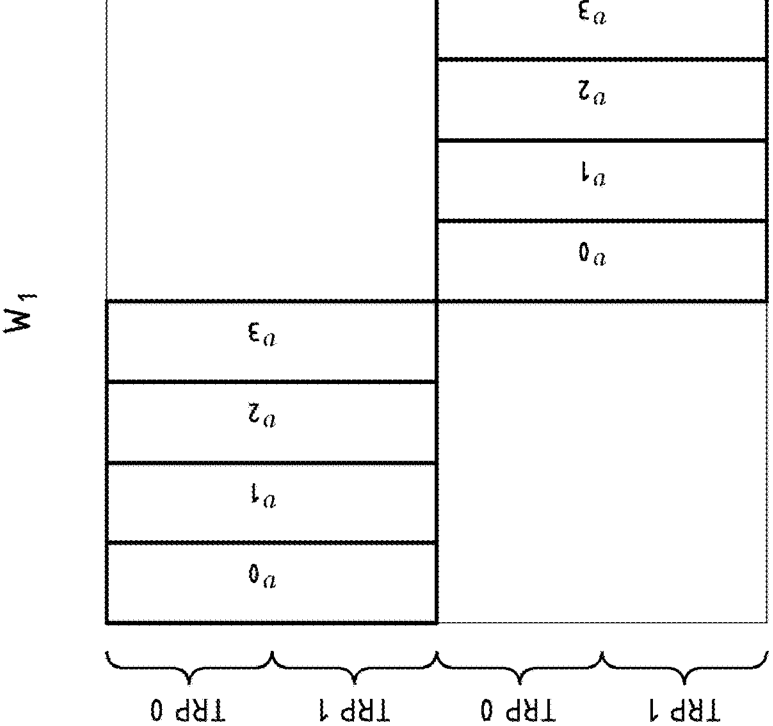

FIG. 7 shows how the L=4 selected SD beams from the aggregated codebook are combined to form the precoder vector for a generic layer and all the subbands of the reporting band. The details of $W_2$ and $$W_f^H$$

will be explained in more detail below.

In more detail, a component $$v_i^{(x)}$$

may be formed by an azimuth component $$t_{m_1^{(i)}}^{(x)}$$

and an elevation component $$u_{m_2^{(i)}}^{(x)}.$$

In case of vertical aggregation, this DFT beam i for TRP x=0, . . . , $N_{TRP}-1$ may be defined as follows $$v_i^{(x)} = t_{m_1^{(i)}} \otimes u_{m_2^{(i)}}^{(x)}$$

$$t_{m_1^{(i)}} = t_{m_1^{(i)}}^{(x)} = \left[1 \quad e^{j2\pi\frac{m_1^{(i)}}{O_1N_1}} \quad \ldots \quad e^{j2\pi\frac{m_1^{(i)}(N_1-1)}{O_1N_1}}\right]^T$$

$$u_{m_2^{(i)}}^{(x)} = \left[e^{j2\pi\frac{m_2^{(i)}N_2x}{N_{TRP}O_2N_2}} \quad e^{j2\pi\frac{m_2^{(i)}(N_2x+1)}{N_{TRP}O_2N_2}} \quad \ldots \quad e^{j2\pi\frac{m_2^{(i)}[(N_2x+1)x-1]}{N_{TRP}O_2N_2}}\right]^T.$$

In case of horizontal aggregation, DFT beam i for TRP x=0, . . . , $N_{TRP}-1$ may be defined as follows $$v_i^{(x)} = u_{m_2^{(i)}} \otimes t_{m_1^{(i)}}^{(x)}$$

$$t_{m_1^{(i)}}^{(x)} = \left[e^{j2\pi\frac{m_1^{(i)}N_1x}{N_{TRP}O_1N_1}} \quad e^{j2\pi\frac{m_1^{(i)}(N_1x+1)}{N_{TRP}O_1N_1}} \quad \ldots \quad e^{j2\pi\frac{m_1^{(i)}[(N_1x+1)x-1]}{N_{TRP}O_1N_1}}\right]^T$$

$$u_{m_2^{(i)}} = u_{m_2^{(i)}}^{(x)} \begin{cases} \left[1 \quad e^{j2\pi\frac{m_2^{(i)}}{O_2N_2}} \quad \ldots \quad e^{j2\pi\frac{m_2^{(i)}(N_2-1)}{O_2N_2}}\right]^T, & N_2 > 1 \\ 1 & N_2 = 1 \end{cases}.$$

Figure 8:
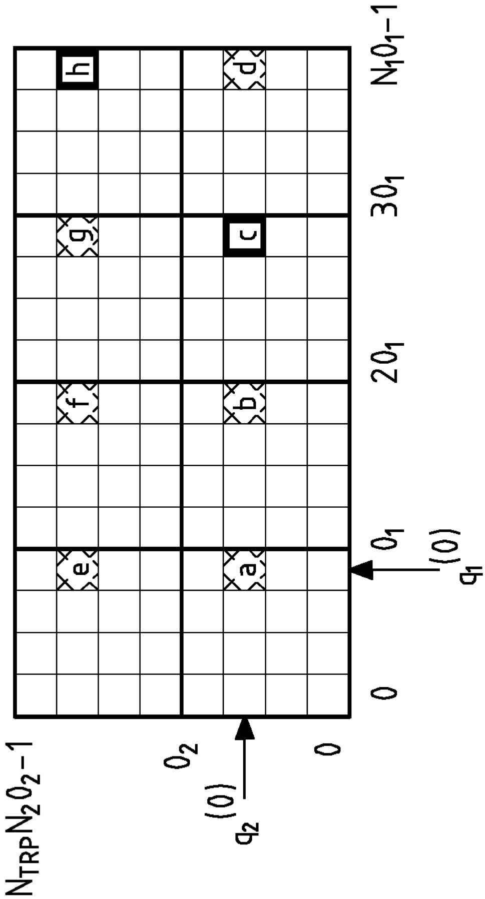
FIG. 8 schematically illustrates non-aggregated size-$N_1O_1N_2O_2$ codebooks for each TRP of a CJT setup with P=32 antenna ports and an array layout $(N_{TRP},N_1,N_2)=(2,4,2)$ with two polarizations and oversampling $(O_1,O_2)=(4,4)$.
Figure 8:
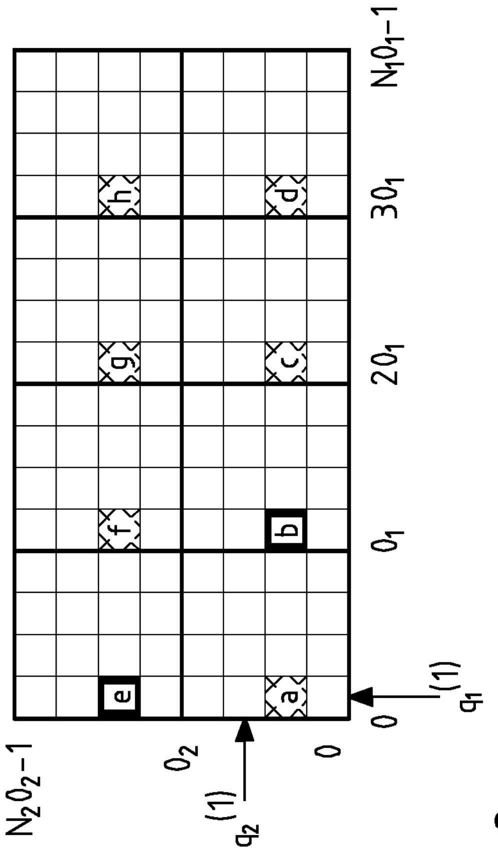
Figure 8:
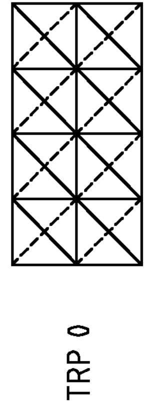
Figure 8:
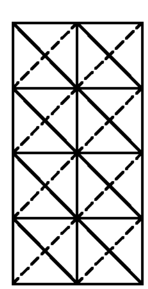

Note that above a typical array layouts with $N_1>1$ and $N_2\geq1$ was considered. In FIGS. 7 and 8 the shaded blocks show the selected SD basis formed by 16 orthogonal DFT beams, whereas the solid blocks illustrate the L=4 selected aggregated beams for the two cases of vertical and horizontal aggregation, respectively. The disclosure is however not limited to the discussed array layout.

2. Selection of $L_x \leq L$ Beams Per TRP from a Non-Aggregated Codebook (e.g. of Size $N_1O_1N_2O_2$)

In this case non-aggregated codebooks are defined for the $N_{TRP}$ TRPs. The TRPs may share the same codebook or have different codebooks of size $N_1O_1N_2O_2$. The UE is instructed to select $L_0$ beams for TRP 0, $L_1$ beams for TRP 1, etc., such that the total number of selected beams equals $$L = \sum_{x=0}^{N_{TRP}-1} L_x.$$

In one example, the number of selected beams is configured to be the same across all TRPs, i.e., $L_x = L/N_{TRP}$, for x=0, . . . , $N_{TRP}-1$. In a second example, the values $L_x$ are different and network configured. In a third example, the values $L_x$ are selected by a UE and reported, with $0 \leq L_x \leq L$.

In the third example, the CJT CSI report includes transmission point selection (TPS), as a UE may decide to report CSI on a subset of TRPs. However, in the third example, reporting requires higher overhead, because the UE needs to indicate the selected values of L, in Part 1 of the CSI report, which has fixed size, for the gNB to be able to determine the payload size of Part 2, which is variable.

Similarly to FIGS. 5 and 6, FIG. 8 shows an example of a CJT setup with P=32 antenna ports and an array layout $(N_{TRP},N_1,N_2)=(2,4,2)$ and oversampling $(O_1,O_2)=(4,4)$. Each of the two Port Groups/TRPs may be associated to a size-$N_1O_1N_2O_2$ codebook. A UE may select $L_0=L/N_{TRP}=2$ beams for TRP 0 from the basis identified by offsets $$\left(q_1^{(0)}, q_2^{(0)}\right)$$

and formed by $N_1N_2$ beams. The other $L_1=L/N_{TRP}=2$ beams are selected for TRP 1 from the basis identified by offsets $$\left(q_1^{(1)}, q_2^{(1)}\right)$$

$(q_1^{(1)},q_2^{(1)})$ and formed by $N_1N_2$ beams.

For a DFT codebook, shared by all TRPs, the beam $i=0, \ldots, L_x-1$ for TRP $x=0, \ldots, N_{TRP}-1$ may be identified by the pair of indices $$\left(m_1^{(i,x)}, m_2^{(i,x)}\right), \text{ where } m_1^{(i,x)} = O_1 n_1^{(i,x)} + q_1^{(x)} \text{ and } m_2^{(i,x)} = O_2 n_2^{(i,x)} + q_2^{(x)}$$

and defined as follows $$v_i^{(x)} = t_{m_1^{(i,x)}} \otimes u_{m_2^{(i,x)}}$$

$$t_{m_1^{(i,x)}} = \left[\begin{matrix} 1 & e^{j2\pi\frac{m_1^{(i,x)}}{O_1N_1}} & \ldots & e^{j2\pi\frac{m_1^{(i,x)}(N_1-1)}{O_1N_1}} \end{matrix}\right]^T$$

$$u_{m_2^{(i,x)}} = \begin{cases} \left[\begin{matrix} 1 & e^{j2\pi\frac{m_2^{(i,x)}}{O_2N_2}} & \ldots & e^{j2\pi\frac{m_2^{(i,x)}(N_2-1)}{O_2N_2}} \end{matrix}\right]^T, & N_2 > 1 \\ 1 & N_2 = 1 \end{cases}.$$

Note that for this approach, the total number of beams, L, may not be smaller than $N_{TRP}$ to ensure that each TRP is active in the CJT transmission, i.e. $L \geq N_{TRP}$. In a different configuration, a UE may be free to select $L_0$ and $L_1$ beams for TRP 0 and TRP 1, respectively, with $0 \leq L_1$, $L_2 \leq L$, such that $L_0+L_1=L$. In this case, a UE may exclude one or more TRPs from the CJT transmission hypothesis by not selecting any beams associated with the respective TRP.

Figure 9:
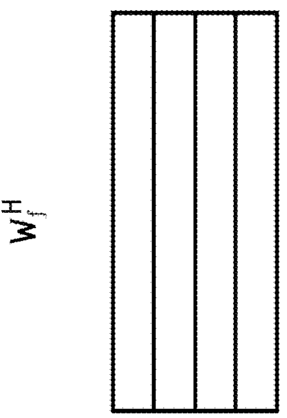
FIG. 9 shows how the L=4 SD beams selected from the codebook of FIG. 8 are combined to form the precoder vector for a generic layer and all the subbands of the reporting band.
Figure 9:
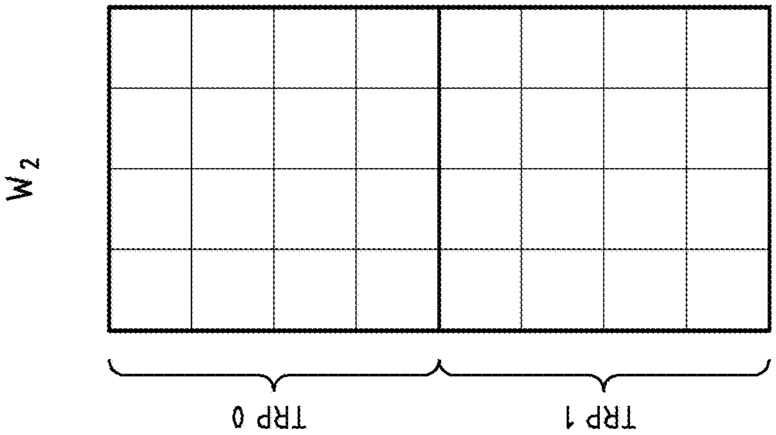
Figure 9:
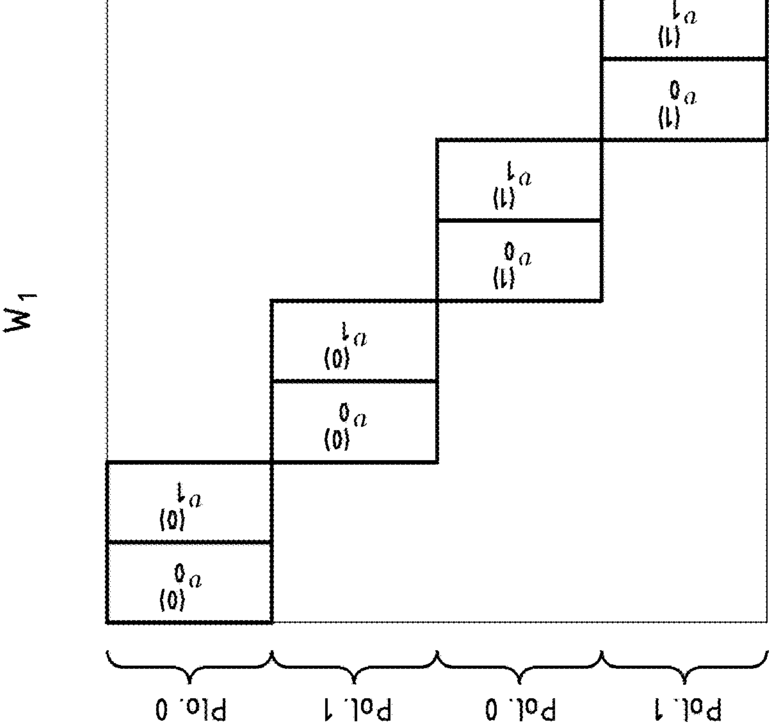

Similarly to FIG. 7, FIG. 9 shows how the L=4 selected SD beams are combined to form the precoder vector for a generic layer and all the subbands of the reporting band. Again, all the $$v_i^{(x)}$$

for a certain pont group x can be considered to be a separately determined port group-specific set of precoding parameters specific to the CSI-RS port group x. More specifically, the top left sub-matrix comprised of $$v_0^{(0)} \text{ and } v_1^{(0)}$$

for each polarization may be considered to be a separately determined port group-specific set of precoding parameters specific to the CSI-RS port group 0. Likewise the bottom right sub-matrix comprised of $$v_0^{(1)} \text{ and } v_1^{(1)}$$

for each polarization may be considered to be a further separately determined port group-specific set of precoding parameters specific to the CSI-RS port group 1.

Figure 10:
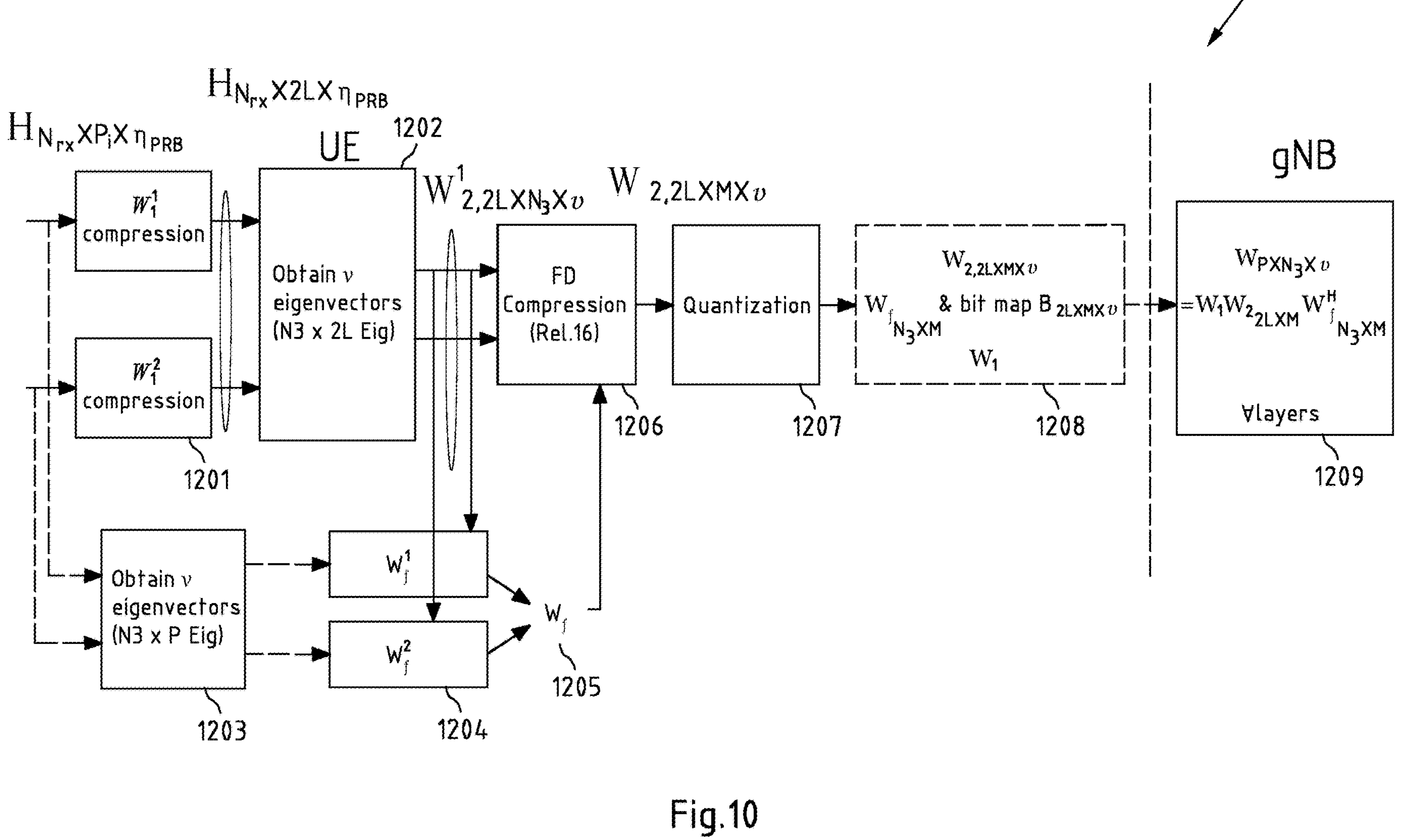
FIG. 10 is a schematic block diagram illustrating the calculation of the quantities of FIG. 9 at the UE based on a Rel.16 eType II UE-gNB chain for CJT with M-TRP.

FIG. 10 now illustrates is a block diagram 1200 illustrating the calculation of the quantities of FIG. 9 at the UE based on a proposed Rel. 16 eType II UE-gNB chain for CJT with M-TRP.

Therein, based on the CSI-RS measurements yielding matrix $H_{N\times P\times\eta}$ (which may be obtained, for example, from least-square (LS) estimation of the CSI-RS signals), a first matrix $W_1^1$ and a second matrix $W_1^2$ (corresponding to the top left and bottom right submatrices of $W_1$ as shown in FIG. 9) may separately be determined as two port group-specific sets of precoding parameters (spatial domain basis components) specific to the respective two CSI-RS port groups (spatial compression), action 1201. This may yield matrix H after spatial compression, i.e. $H_{N\times 2L\times\eta}$. Also, v eigenvectors and thus matrix $W'_2$ may be determined, action 1202. Further, a first matrix $W_f^1$ and a second matrix $W_f^2$ may separately be determined as two port group-specific sets of precoding parameters (frequency domain basis components) specific to the respective two CSI-RS port groups (frequency compression), action 1204. Alternatively, computation of $W_f$ (and $W_f^1$ and $W_f^2$) may be done before spatial compression, as indicated by the dashed line and eigenvalue computation at action 1203. $W_f^1$ and $W_f^2$ may be combined into matrix $W_f$, action 1205. Based thereon, a frequency compressed $W_2$ matrix may be jointly determined as a common set of precoding parameters across the at least two CSI-RS port groups (linear combining coefficients), action 1206. Thereafter, quantization may follow, action 1207. The precoding information $W_1$ (comprising $W_1^1$ and $W_1^2$), $W_f$ (comprising $W_f^1$ and $W_f^2$) and $W_2$ may be transmitted from the UE to the gNB as a CSI report, action 1208. Moreover, a bitmap B may be reported to indicate the position of the non-zero coefficients of $W_2$. This is because there is a maximum number of coefficients that can be reported and the others are set to 0. The gNB may use this information to determine the precoder W for all layers, action 1209.

3. Selection of L Beams Per TRP from a Non-Aggregated Codebook (e.g. of Size $N_1O_1N_2O_2$)

In this case, the codebooks are non-aggregated like in case 2 above, however L beams are selected per port group/TRP and aggregated after selection such that each aggregated beam i is formed by aggregating $N_{TRP}$ beams, one per TRPs. Compared to the above described case 1, this approach offers greater flexibility in forming the aggregated beams of size $N_{TRP}N_1N_2$. However, this method requires additional signalling of an L-beam permutation for each TRP except the first. Each permutation of L beams can be indicated with $\lceil \log_2(L!) \rceil$ bits by using a factorial number system to number the L! permutations of the L beams. By assuming a predetermined order of the beams for the first TRP, for example, by increasing order of their index, the total minimum bitwidth required is $\lceil \log_2((N_{TRP}-1)L!) \rceil$. Let $v_i$ be the i-th aggregated beam, $$v_i^{(x)}$$

beam i for Port Group/TRP x, and $$v^{(x)}_{\pi_x^{-1}(i)}$$

the beam index for TRP x forming the aggregated beam i, where $\pi_x(i)$ is the beam permutation indicated for Port Group/TRP x. The aggregated beam is given by $$v_i = \begin{bmatrix} v_i^{(0)} \\ v^{(1)}_{\pi_1(i)} \\ \vdots \\ v^{(N_{TRP}-1)}_{\pi_{N_{TRP}-1}(i)} \end{bmatrix}$$

where $$v_i^{(x)}$$

is given as in the above described case 2 where i=0, . . . , L−1 for all TRPs.

Similarly to FIGS. 5, 6 and 10 above, FIG. 11 shows an example of a CJT setup with P=32 antenna ports and an array layout $(N_{TRP},N_1,N_2)=(2,4,2)$ and oversampling $(O_1, O_2)=(4,4)$. Each of the two Port Groups/TRPs is associated to a size-$N_1O_1N_2O_2$ codebook. A UE selects L=4 beams for each Port Group/TRP:

$$v_0^{(0)} = c,\ v_1^{(0)} = d,\ v_2^{(0)} = g,\ v_3^{(0)} = h$$

for Port Group/TRP 0 and $$v_0^{(1)} = a,\ v_1^{(1)} = b,\ v_2^{(1)} = e,\ v_3^{(1)} = f$$

for Port Group/TRP 1. The UE also reports the permutation $\pi_1=(3,0,1,2)$ for the beams of TRP 1, hence the L=4 aggregated beams are formed by stacking the beam pairs, i.e., $$v_0 = \begin{bmatrix} c \\ f \end{bmatrix},\ v_1 = \begin{bmatrix} d \\ a \end{bmatrix},\ v_2 = \begin{bmatrix} g \\ b \end{bmatrix},\ v_3 = \begin{bmatrix} h \\ e \end{bmatrix}.$$

Figure 12:
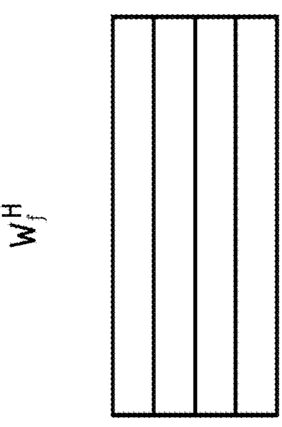
FIG. 12 shows how the L=4 aggregated beams selected from the codebook of FIG. 11 by the UE are combined to form the precoder vector for a generic layer and all the subbands of the reporting band.
Figure 12:
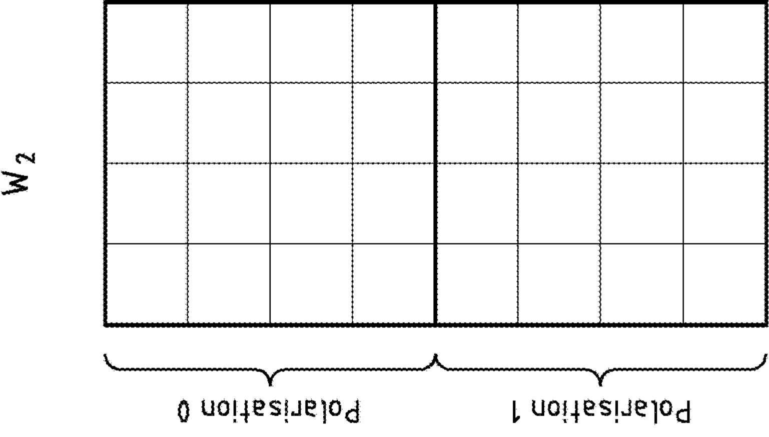

Similarly to FIGS. 7 and 9 above, FIG. 12 shows how the L=4 aggregated beams selected by the UE are combined to form the precoder vector for a generic layer and all the subbands of the reporting band. The separately determined port group-specific sets of precoding parameters belonging to a respective CSI-RS port group (TRP 0 and TRP 1) are indicated in FIG. 12 as belonging to TRP0 and TRP1, respectively.

Figure 13:
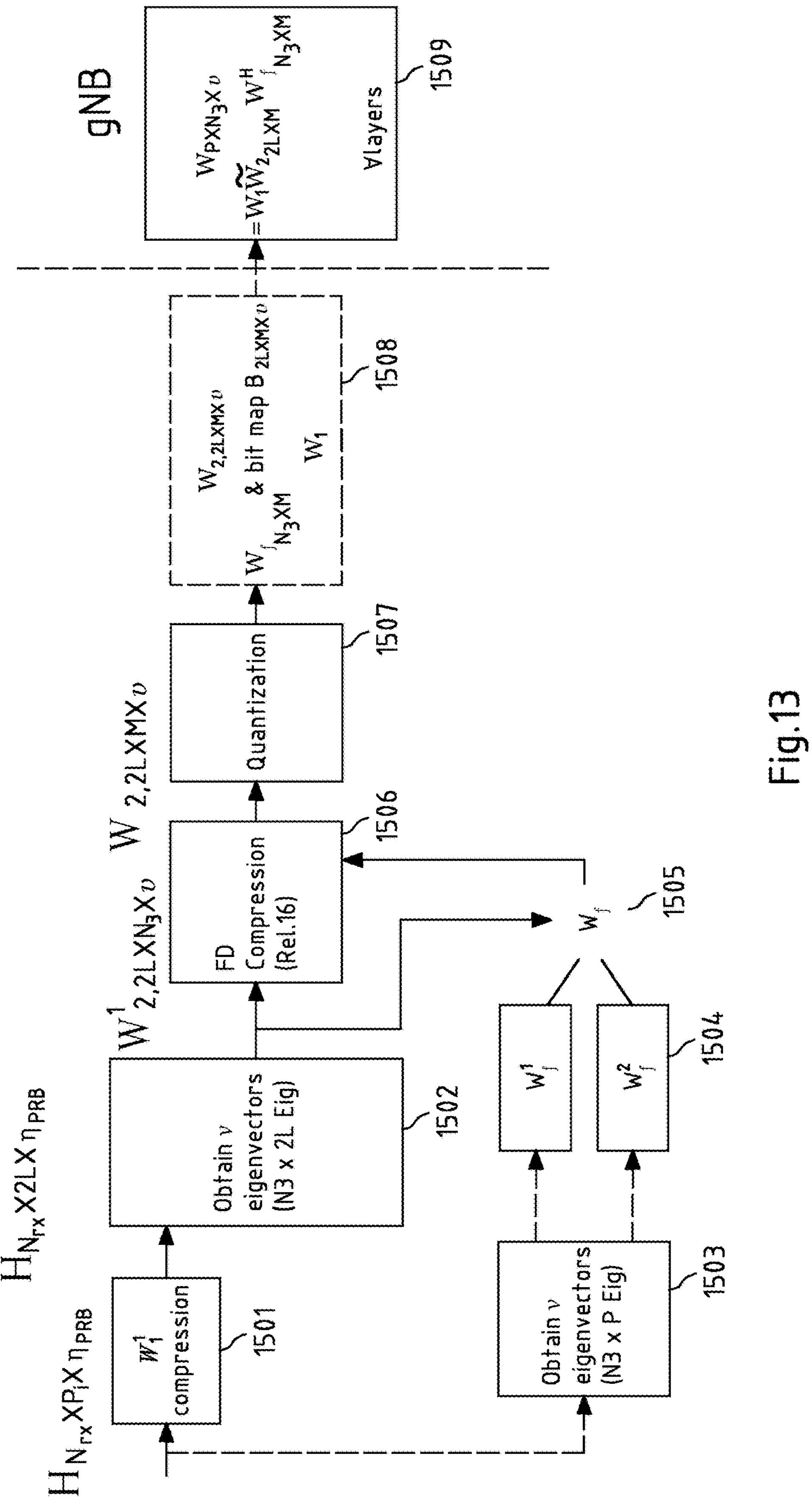
FIG. 13 is a block diagram illustrating the calculation of the quantities of FIG. 12 at the UE.

Similarly to FIG. 10, FIG. 13 is a block diagram 1500 illustrating the calculation of the quantities of FIG. 12 at the UE. Therein, based on the CSI-RS measurements (matrices $H_{N\times P\times\eta}$ and $H_{N\times 2L\times\eta}$ before and after spatial compression) a matrix $W_1$ may be determined based on port group-specific sets of precoding parameters (spatial domain basis components) specific to the respective two CSI-RS port groups (spatial compression), action 1501, and v eigenvectors and thus matrix $W'_2$ may be determined, action 1502. Further, a first matrix $W_f^1$ and a second matrix $W_f^2$ may separately be determined as two port group-specific sets of precoding parameters (frequency domain basis components) specific to the respective two CSI-RS port groups are determined (frequency compression), action 1504. Alternatively, computation of $W_f$ (and $W_f^1$ and $W_f^2$) may be done before spatial compression, as indicated by the dashed line and eigenvalue computation at action 1503. $W_f^1$ and $W_f^2$ may be combined into matrix $W_f$, action 1505. Based thereon, a frequency compressed $W_2$ matrix may be jointly determined as a common set of precoding parameters across the at least two CSI-RS port groups (linear combining coefficients), action 1506. Thereafter, quantization may follow, action 1507. The precoding information $W_1$, $W_f$ (comprising $W_f^1$ and $W_f^2$) and $W_2$ may be transmitted from the UE to the gNB as a CSI report, action 1508. Again, a bitmap B may be reported to indicate the position of the non-zero coefficients of $W_2$. The gNB may use this information to determine the precoder W for all layers, action 1509.

FD Basis Components Determination

In general a UE may determine separate $M_x$ FD basis components for each Port Group/TRP x=0, . . . , $N_{TRP}-1$ and for each layer. Note that some of the components for a given layer may be common between two or more port groups, hence reporting $N_{TRP}$ separate component sets per layer requires significant overhead and is inefficient. To reduce feedback overhead, a UE may be configured to report a single set of M FD basis components for each reported layer, in which case the FD components are said to be layer specific but polarisation common and Port Group/TRP common. To improve the reporting mechanism of a single set of M FD components, in the following a method is described in order to maximise overlap between the components of different TRPs.

In legacy codebooks the FD basis component indices are reported relative to reference, which is either the FD component of the strongest coefficient for a given layer (Rel. 16) or the selected FD component of lowest index (Rel. 17). This is possible because a precoder vector is transparent to a phase multiplication applied to all the transmit ports, hence a cyclic shift applied to the selected FD component indices does not need reporting. In case of CJT, a UE may calculate the FD components separately for each Port Group/TRP. To maximise the overlap between the components of different TRPs, a cyclic shift may be applied to the FD components of TRP x for x=1, . . . , $N_{TRP}-1$, to best align them to the components of TRP 0. However, because CJT transmission requires the Port Group/TRPs to be synchronised in phase as well as time, these $N_{TRP}-1$ cyclic shifts need to be reported and compensated for in the precoder reconstruction.

Figure 14:
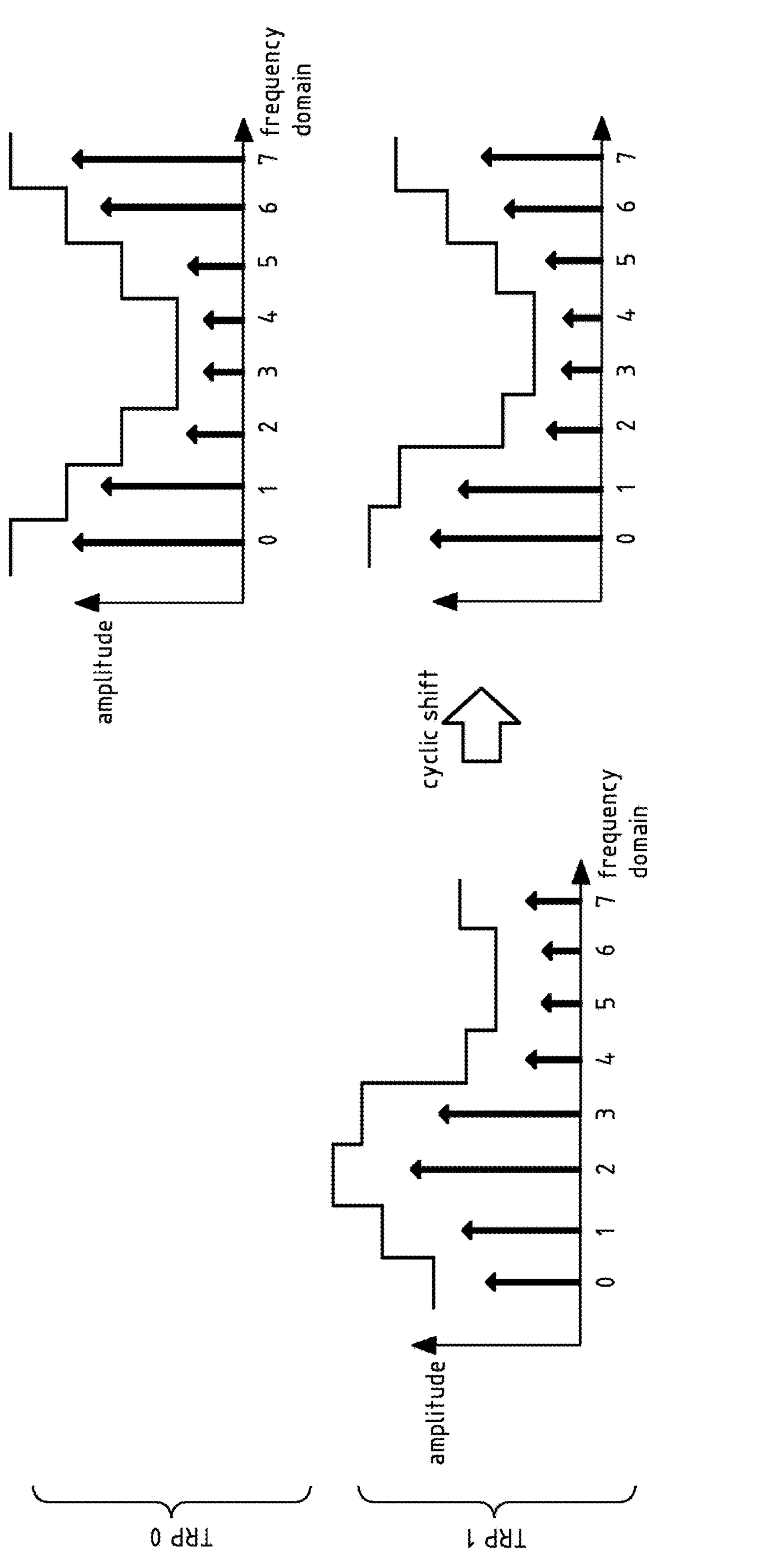
FIG. 14 illustrate an example of cyclic shift applied to the FD components of TRP 1 to align their amplitude profile to that of TRP 0.

FIG. 14 illustrate an example of cyclic shift applied to the FD components of TRP 1 to align their amplitude profile to that of TRP 0. The UE may then select, for example, the M=4 strongest FD components for both TRPs as components 0,1,6,7. The UE reports a cyclic shift $\alpha_1=2$ for TRP 1.

Figure 15:
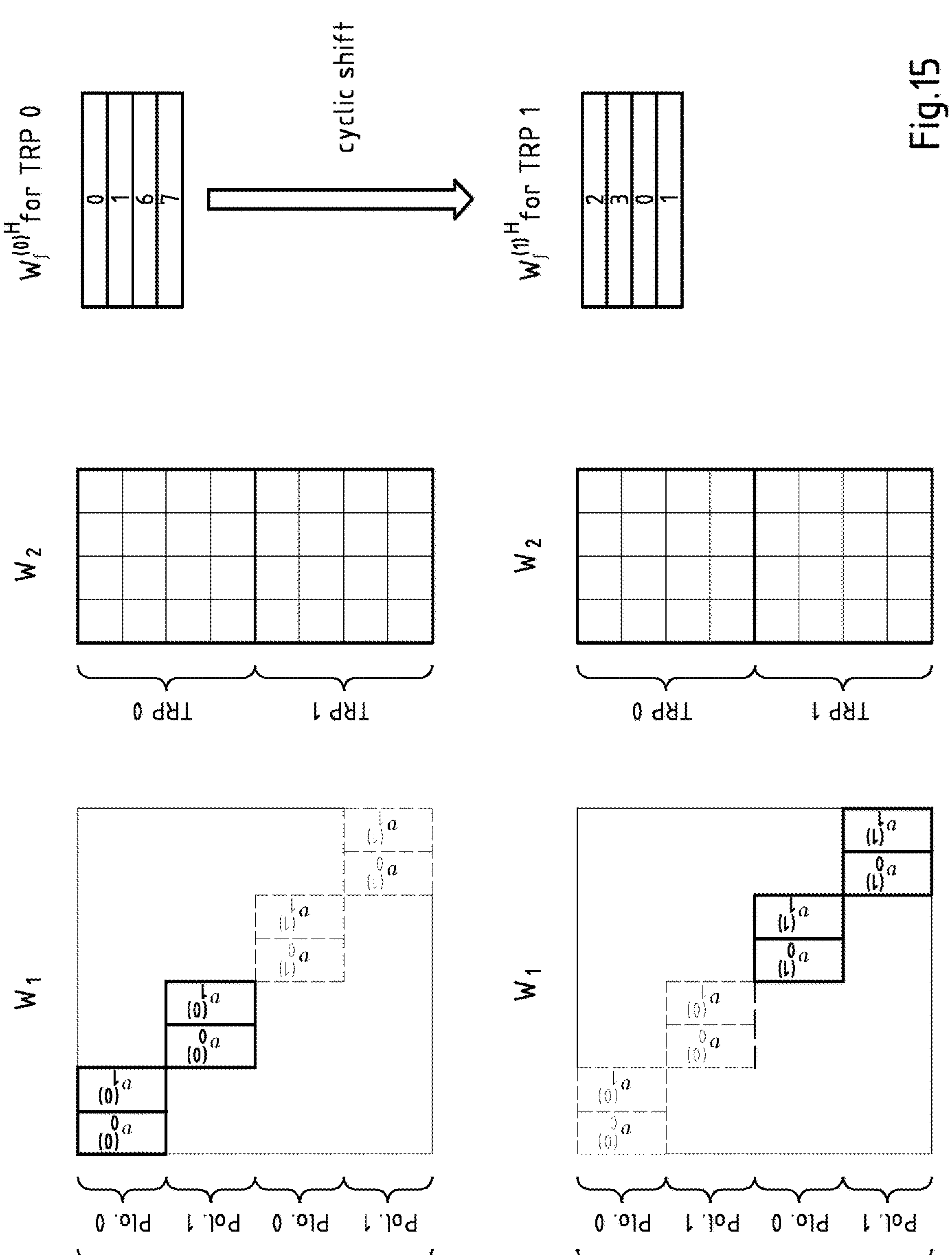
FIG. 15 illustrates the application of the cyclic shift determined as illustrated in FIG. 16 in the precoder matrix reconstruction of FIG. 9 to obtain a shifted set of FD components for TRP 1.

This cyclic shift is applied in the precoder matrix reconstruction to obtain a shifted set of FD components for TRP 1, such that components 2,3,0,1 are used to combine beams for TRP 1 and FD components 0,1,6,7 are used for TRP 0, as illustrate in FIG. 15 for the beam selection scheme of FIG. 9.

Combination Coefficients

Whilst the SD beams and FD basis components may be determined separately for each Port Group/TRP, in a CJT measurement hypothesis the (non-zero) combination coefficients (NZC) need to be calculated jointly across Port Groups/TRPs in all schemes described above because a layer is formed by a combination of beams transmitted by multiple Port Groups/TRPs.

In the example scheme of FIG. 15, the DL precoder $$W_t^r$$

for subband t=0, . . . , $N_3-1$ and layer r=1, . . . , v can be expressed as follows $$W_t^r = \frac{1}{\sqrt{\gamma_{t,l}}}\begin{bmatrix} \sum_{i=0}^{L_0-1} v_i^{(0)} \sum_{f=0}^{M_1-1} y_{t,l}^{(f,0)} p_{r,i,f}\varphi_{r,i,f} \\ \sum_{i=0}^{L_0-1} v_i^{(0)} \sum_{f=0}^{M_1-1} y_{t,l}^{(f,0)} p_{r,i+L_1,f}\varphi_{r,i+L_1,f} \\ \sum_{i=0}^{L_1-1} v_i^{(1)} \sum_{f=0}^{M_2-1} y_{t,l}^{(f,1)} p_{r,i+2L_1,f}\varphi_{r,i+2L_1,f} \\ \sum_{i=0}^{L_1-1} v_i^{(1)} \sum_{f=0}^{M_2-1} y_{t,l}^{(f,1)} p_{r,i+L+L_1,f}\varphi_{r,i+L+L_1,f} \end{bmatrix}, r = 1, ..v$$

The $L_x$ spatial beams $$v_i^{(x)},$$

with x=0,1, are DFT vectors representing the i-th beam of Port Group/TRP x. The DFT-based components of $$W_f^{(r,x)H}$$

for layer r are given by $$\left[W_f^{(r,x)H}\right]_{t,f} = y_{t,r}^{(f,x)},$$

with t=0, . . . , $N_3-1$, f=0, . . . , M−1 and x=0,1. The elements of $$W_2^r$$

for layer r are given by $$[W_2^r]_{i,f} = p_{r,i,f}\varphi_{r,i,f},$$

with i=0, . . . , 2L−1 and f=0, . . . , M−1 where $$p_{r,i,f} = p^{(1)}_{r,\lfloor \frac{i}{L} \rfloor} p^{(2)}_{r,i,f}$$

is the amplitude and $\varphi_{r,i,f}$ is a complex exponential. A power normalisation factor $\gamma_{t,r}$ ensures that the wideband power of each layer is notmalised to 1.

In the example schemes of FIG. 7 and FIG. 12, the precoder $$W_t^r$$

for subband t=0, . . . , $N_3-1$ and layer r=1, . . . , v can be expressed as follows, where a possible time shift $\alpha_1$ for the FD components of TRP 1 relative to TRP 0 is applied as a phase ramp across the $N_3$ frequency units $$W_t^r = \frac{1}{\sqrt{\gamma_{t,l}}}\begin{bmatrix} \sum_{i=0}^{L-1} v_{i,t} \sum_{f=0}^{M-1} y_{t,r}^{(f)} p_{r,i,f}\varphi_{r,i,f} \\ \sum_{i=0}^{L-1} v_{i,t} \sum_{f=0}^{M-1} y_{t,r}^{(f)} p_{r,i+L,f}\varphi_{r,i+L,f} \end{bmatrix}, r = 1, ..v$$

The L spatial beams $v_{i,t}$ are obtained as $$v_{i,t} = \begin{bmatrix} v_i^{(0)} \\ \alpha_{1,t} v_i^{(1)} \end{bmatrix},$$

where $$v_i^{(x)}$$

is a DFT vector corresponding to the i-th beam of Port Group/TRP x, and $$\alpha_{1,t} = e^{j\frac{2\pi t \alpha_1}{N_3}}$$

is a phase ramp. The DFT-based components of $$W_f^H$$

for layer r are given by $$\left[W_f^H\right]_{t,f} = y_{t,r}^{(f)},$$

with t=0, . . . , $N_3-1$ and f=0, . . . , M−1. The elements of $W_2$ for layer r are given by $[W_2]_{i,f}=p_{r,i,f}\varphi_{r,i,f}$, with i=0, . . . , 2L−1 and f=0, . . . , where $$p_{r,i,f} = p^{(1)}_{r,\lfloor \frac{i}{L} \rfloor} p^{(2)}_{r,i,f}$$

is the amplitude and $\varphi_{r,i,f}$ is a complex exponential. A power normalisation factor $\gamma_{t,r}$ ensures that the wideband power of each layer is normalised to 1.

Figure 16:
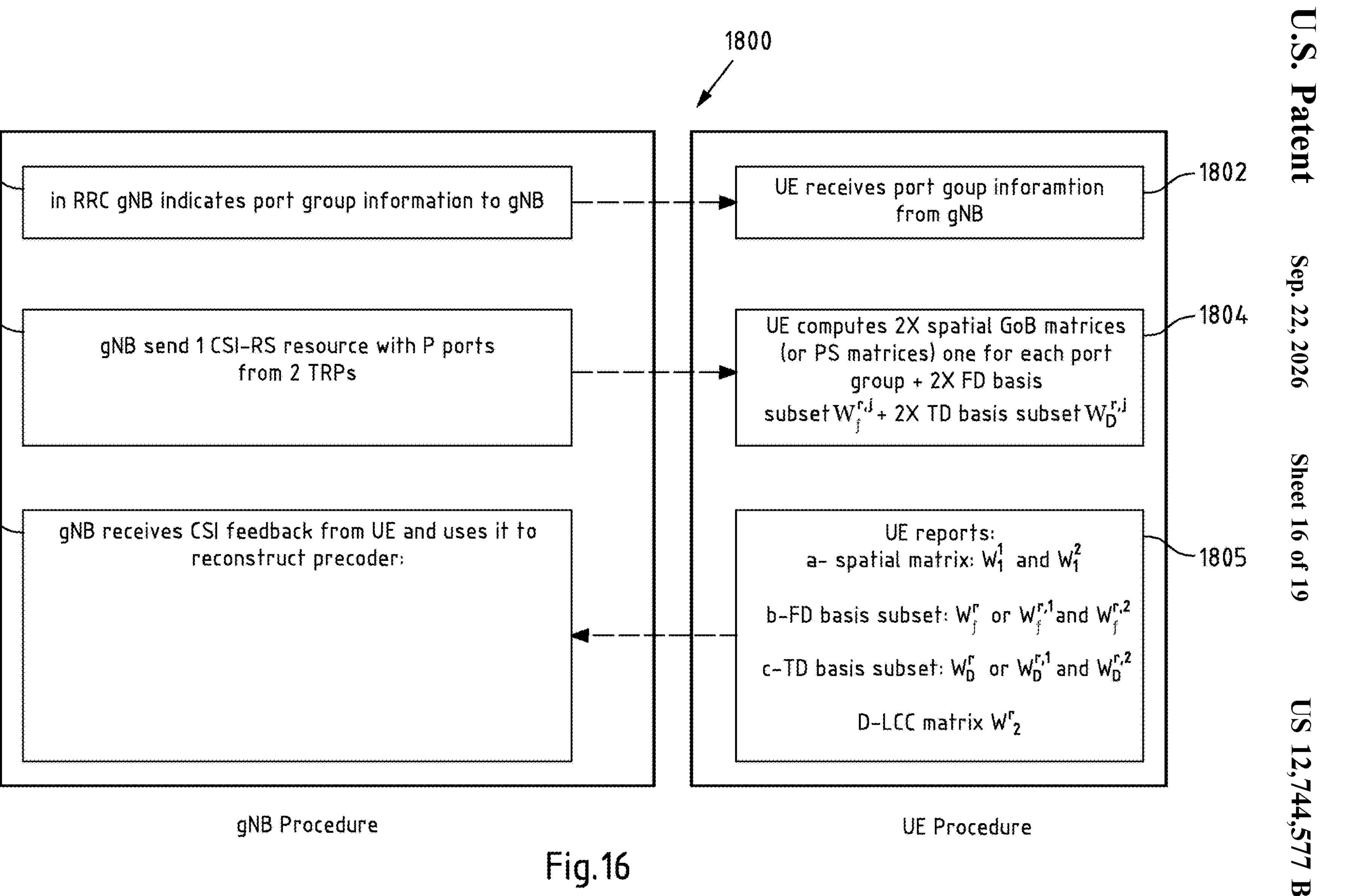
FIG. 16 depicts a flowchart of the proposed scheme illustrated in the diagram of FIG. 10.
Figure 17:
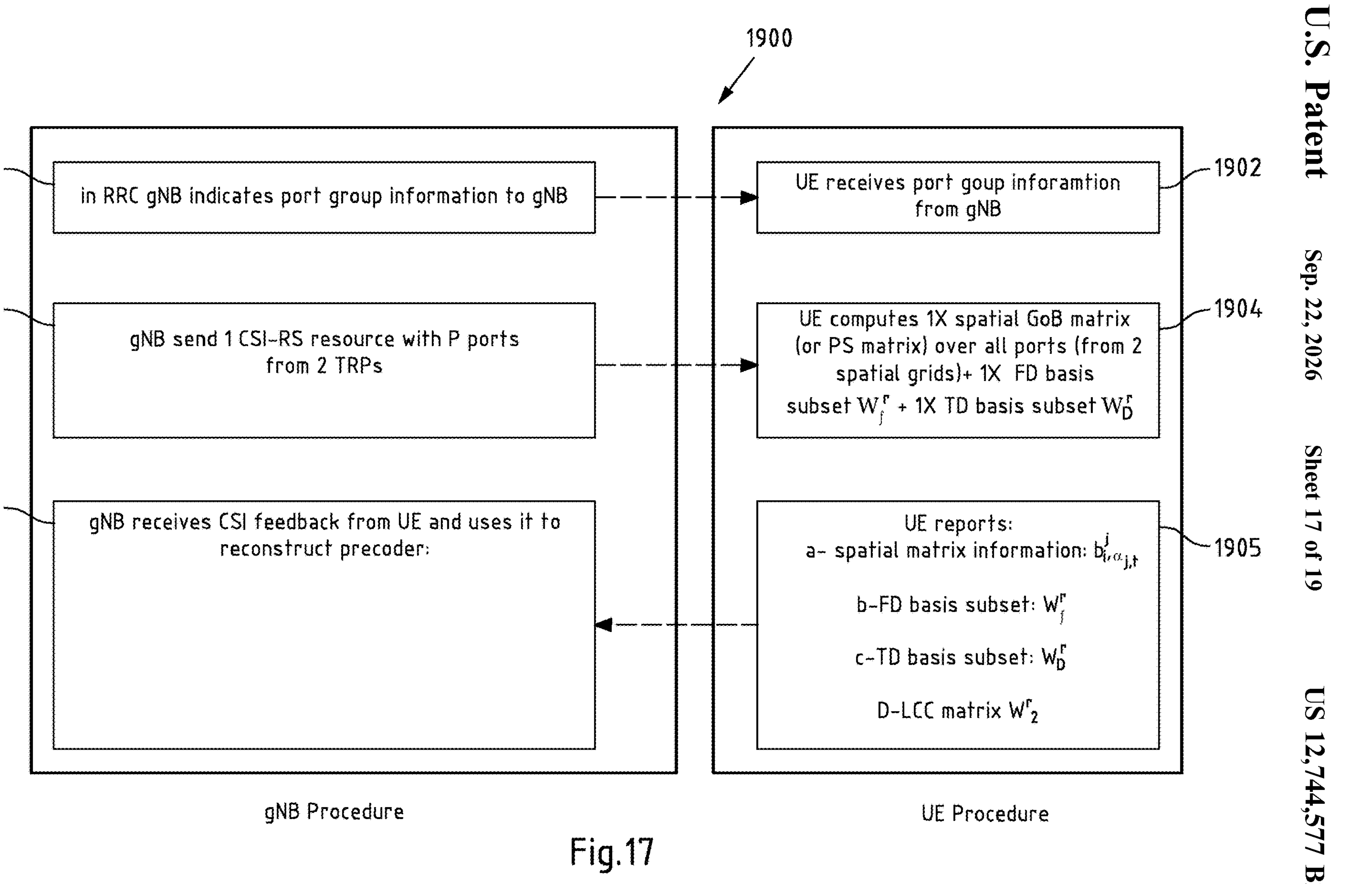
FIG. 17 depicts a flowchart of the proposed scheme illustrated in the diagram of FIG. 13.

FIG. 16 and FIG. 17 depict the flowcharts 1800, 1900 of the proposed schemes illustrated in the diagrams of FIG. 10 and FIG. 13, respectively.

Turning to FIG. 16, the gNB will indicate port group information to the UE via RRC signaling, which will be received by the UE, actions 1801, 1802. The gNB will then send one CSI-RS resource (however, multiple CSI-Resources as described above may also be used) with P port from two (or more) TRPs, action 1803. Based on the received CSI-RS resources(s), the UE will compute two (or more) spatial Grid of Beam (GoB) or port selection (PS) matrices $$W_1^1 \text{ and } W_1^2$$

(sets of basis components) one for each port group, as described above. The UE will also compute two (or more) frequency domain (FD) matrices $$W_j^{r,1} \text{ and } W_j^{r,2}$$

(sets of basis components) and, optionally, two (or more) time domain (TD, doppler) matrices $$W_D^{r,1} \text{ and } W_D^{r,2}$$

(sets of basis components) action 1804. The UE can then report these determined precoding parameter sets individually or in respective combined matrices $$(W_1, W_j^r, W_D^r \text{ and } W_2^r),$$

action 1805. The gNB will then receive the CSI feedback from the UE and use it in order to reconstruct the precoder $w^r_t$ (see equation for $w^r_t$ above with respect to FIG. 15), action 1806.

Turning to FIG. 17, the gNB will indicate port group information to the UE via RRC signaling, which will be received by the UE, actions 1901, 1902. The gNB will then send one CSI-RS resource (however, multiple CSI-Resources as described above may also be used) with P port from two (or more) TRPs, action 1903. Based on the received CSI-RS resources(s), the UE will in this case compute one spatial Grid of Beam (GoB) or port selection (PS) matrix over all ports, as described above. The UE will also compute a frequency domain (FD) matrix $$W_j^r$$

and, optionally, a time domain (TD, doppler) matrix $$W_D^r,$$

action 1904. The UE can then report these determined precoding parameter sets $$(v_i^{(x)}, a_{x,t}, W_j^r, W_D^r \text{ and } W_2^r),$$

action 1905. The gNB will then receive the CSI feedback from the UE and use it in order to reconstruct the precoder $w^r_t$ (see equation for $w^r_t$ above with respect to FIGS. 7 and 12), action 1906.

Figure 18:
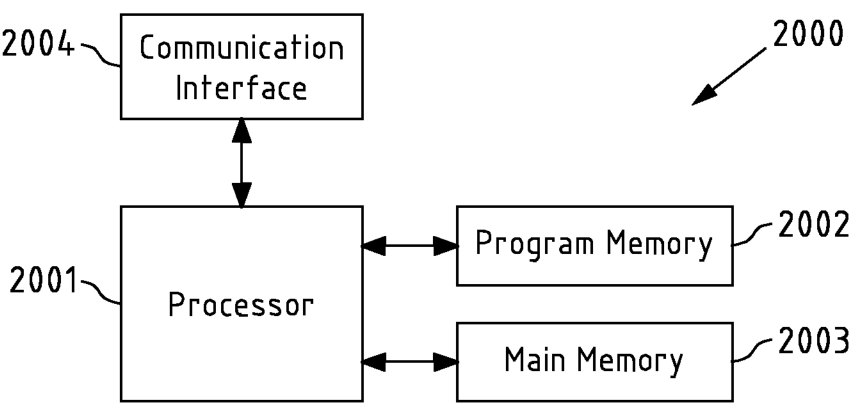
FIG. 18 shows a schematic diagram illustrating a block diagram of an exemplary embodiment of an apparatus according to the present disclosure.

Turning now to FIG. 18, there is shown a block diagram of an exemplary embodiment of a terminal device or UE 2000 according to the present disclosure. For example, UE 2000 may be one of a smartphone, a tablet computer, a notebook computer, a smart watch, a smart band, an IoT device or a vehicle or a part thereof.

UE 2000 comprises a processor 2001. Processor 2001 may represent a single processor or two or more processors, which are for instance at least partially coupled, for instance via a bus. Processor 2001 executes a program code stored in program memory 2002 (for instance program code causing mobile device 2000 in connection with base station 2000 to perform one or more of the embodiments of a method according to the present disclosure or parts thereof, when executed on processor 2001, and interfaces with a main memory 2003. Program memory 2002 may also contain an operating system for processor 2001. Some or all of memories 2002 and 2003 may also be included into processor 2001.

One of or both of a main memory and a program memory of a processor (e.g. program memory 2002 and main memory 2003) could be fixedly connected to the processor (e.g. processor 2001) or at least partially removable from the processor, for instance in the form of a memory card or stick.

A program memory (e.g. program memory 2002) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 2003) may for instance be a volatile memory. It may for instance be a DRAM memory, to give non-limiting example. It may for instance be used as a working memory for processor 2001 when executing an operating system, an application, a program, and/or the like.

Processor 2001 further controls a communication interface 1104 (e.g. radio interface) configured to receive and/or transmit data and/or information. For instance, communication interface 2004 may be configured to transmit and/or receive radio signals from a radio node, such as a base station, in particular as described herein. It is to be understood that any computer program code based processing required for receiving and/or evaluating radio signals may be stored in an own memory of communication interface 2004 and executed by an own processor of communication interface 2004 and/or it may be stored for example in memory 2003 and executed for example by processor 2001.

Communication interface 2004 may in particular be configured to communicate according to a cellular communication system like a 2G/3G/4G/5G or future generation cellular communication system. Terminal device 2000 may use radio interface 2004 to communicate with a base station.

For example, the communication interface 2004 may further comprise a BLE and/or Bluetooth radio interface including a BLE transmitter, receiver or transceiver. For example, radio interface 1104 may additionally or alternatively comprise a WLAN radio interface including at least a WLAN transmitter, receiver or transceiver.

The components 2002 to 2004 of terminal device 2000 may for instance be connected with processor 2001 by means of one or more serial and/or parallel busses.

It is to be understood that terminal device 2000 may comprise various other components. For example, terminal device 2000 may optionally comprise a user interface (e.g. a touch-sensitive display, a keyboard, a touchpad, a display, etc.).

Figure 19:
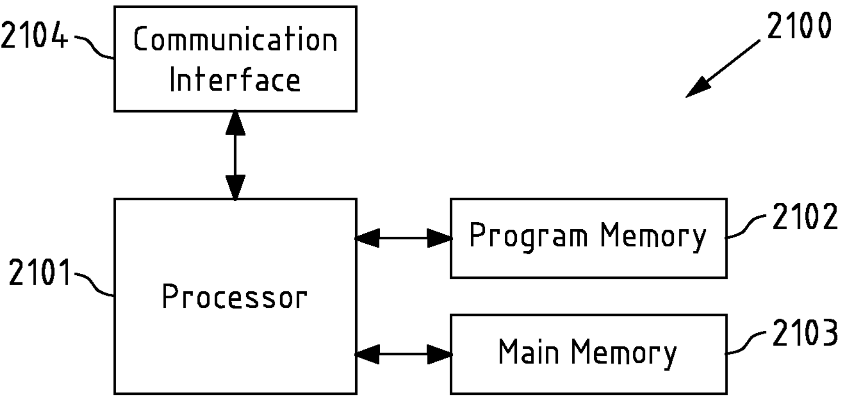
FIG. 19 shows a block diagram of an exemplary embodiment of a base station.

FIG. 19 is a block diagram of an exemplary embodiment of a network device, such as a base station or gNB. For instance, network device 2100 may be configured for scheduling and/or transmitting signals to the UE, as described above.

Network device 2100 comprises a processor 2101. Processor 2101 may represent a single processor or two or more processors, which are for instance at least partially coupled, for instance via a bus. Processor 2101 executes a program code stored in program memory 2102 (for instance program code causing network device 2100 to perform alone or together with terminal device 2000 embodiments according to the present disclosure or parts thereof), and interfaces with a main memory 2103.

Program memory 2102 may also comprise an operating system for processor 2101. Some or all of memories 2102 and 2103 may also be included into processor 2101.

Moreover, processor 2101 controls a communication interface 2104 which is for example configured to communicate according to a cellular communication system like a 2G/3G/4G/5G cellular communication system. Communication interface 2104 of apparatus 2100 may be realized by radio heads for instance and may be provided for communication between network device and terminal device.

The components 2102 to 2104 of apparatus 2100 may for instance be connected with processor 2101 by means of one or more serial and/or parallel busses.

It is to be understood that apparatuses 2000, 2100 may comprise various other components.

Figure 20:
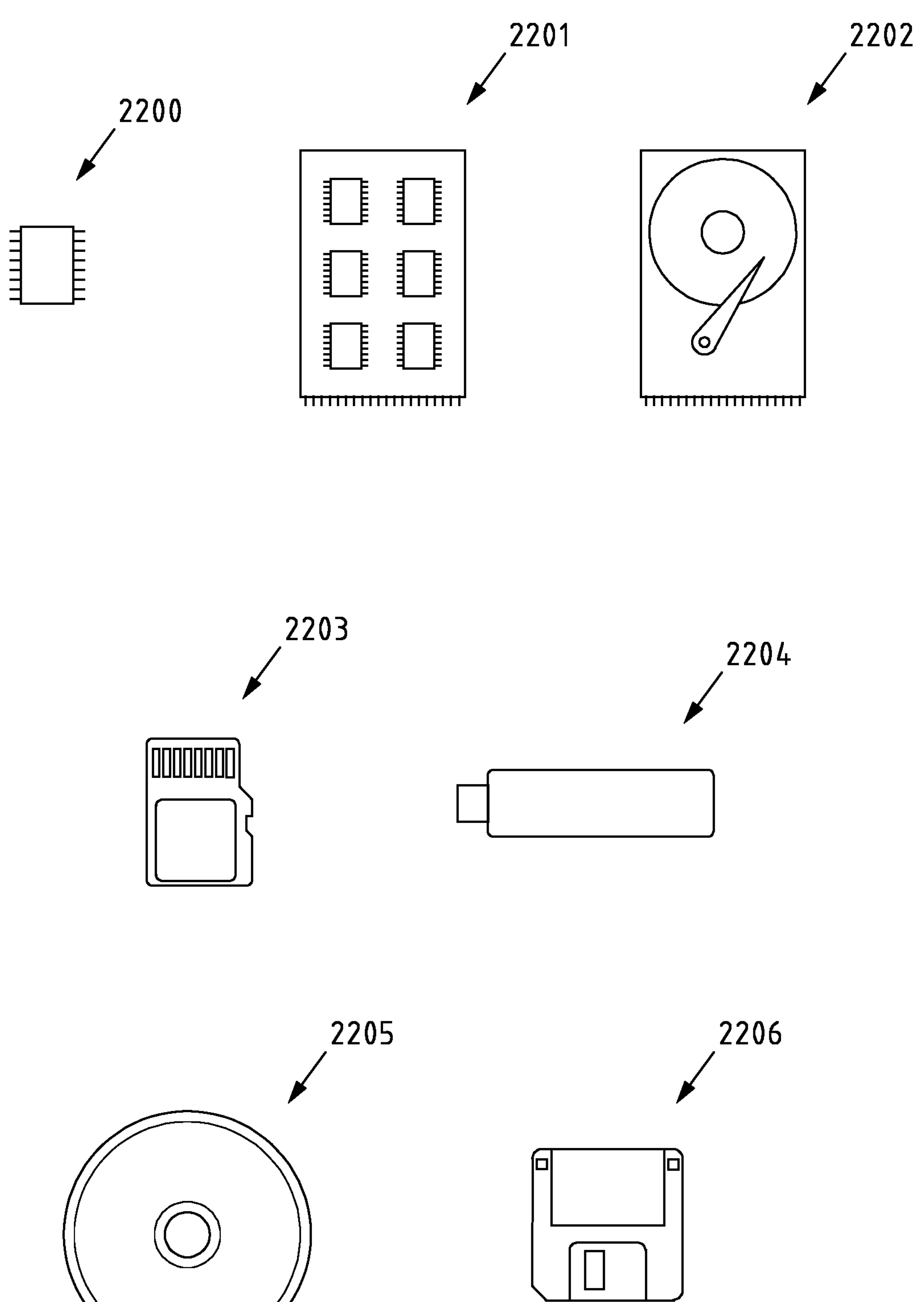
FIG. 20 shows a schematic illustration of examples of tangible and non-transitory computer-readable storage media.

FIG. 20 is a schematic illustration of examples of tangible and non-transitory computer-readable storage media according to the present disclosure that may for instance be used to implement memory 2002 of FIG. 18 or memory 2102 of FIG. 19. To this end, FIG. 20 displays a flash memory 2200, which may for instance be soldered or bonded to a printed circuit board, a solid-state drive 2201 comprising a plurality of memory chips (e.g. Flash memory chips), a magnetic hard drive 2202, a Secure Digital (SD) card 2203, a Universal Serial Bus (USB) memory stick 2204, an optical storage medium 2205 (such as for instance a CD-ROM or DVD) and a magnetic storage medium 2206.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory (ies) that work together to cause an apparatus, such as a mobile phone, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 2001 and 2101 of FIGS. 20 and 21, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICS, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

REFERENCES

[1] RP-193133, New WID: Further enhancements on MIMO for NR, Samsung, 3GPP TSG RAN Meeting #86, Spain, Dec. 9-12, 2019

[2] RP-213517, New WID: MIMO Evolution for Downlink and Uplink, Samsung, 3GPP TSG RAN Meeting #94e

[3] RWS-210319 MIMO Enhancements for Rel-18, Fraunhofer, 3GPP TSG RAN Rel-18 workshop, Jun. 28-Jul. 2, 2021

ABBREVIATIONS

UE user equipment
gNB Next generation NodeB,
DL downlink
UL uplink
CSI channel state information
CSI-RS channel state information reference signal
NR New Radio
M-TRP multiple transmission reception points
MIMO multiple input multiple output
CJT coherent joint transmission
NCJT non-coherent joint transmission
FR1 frequency range 1
FR2 frequency range 2
PDSCH physical downlink shared channel
CMR CSI-RS resource for channel measurement
SD spatial domain
FD frequency domain
TD time domain
FDD frequency domain division
TDD time domain division
SRS sounding reference signal
CB code book
PMI precoding matrix indicator
RRH remote radio head
LCC linear combining coefficients
DFT discrete Fourier transform
UCI uplink control information

The invention claimed is:

1. A terminal device comprising means for:

receiving, from a network device, a port group configuration indicating at least two groups of antenna ports in a channel state information reference signal, CSI-RS, resource set comprising one or more CSI-RS resources, the at least two CSI-RS port groups being associated with at least two respective transmission reception points, TRPs, using coherent joint transmission, CJT, for downlink, DL, communication;

receiving the one or more CSI-RS resources from the at least two TRPs having antenna ports belonging to the at least two respective CSI-RS port groups;

determining, based on the one or more received CSI-RS resources, precoding parameters for DL precoding by the at least two respective TRPs, wherein said determining comprises:

a separate determination of at least two port group-specific sets of precoding parameters specific to the at least two respective CSI-RS port groups; and a joint determination of a common set of precoding parameters across the at least two CSI-RS port groups;

transmitting, to the network device, a CSI report comprising precoding information indicative of the at least two determined port group-specific sets of precoding parameters and the determined common set of precoding parameters.

2. The terminal device according to claim 1, wherein the at least two port group-specific sets of precoding parameters include, for a respective CSI-RS port group, one or more of the following:

a selection of spatial-domain basis components;

a selection of frequency-domain basis components; and a selection of time-domain basis components.

3. The terminal device according to claim 1, wherein the common set of precoding parameters includes combination coefficients of basis components.

4. The terminal device according to claim 1, wherein the at least two CSI-RS port groups are non-overlapping.

5. The terminal device according to claim 1, wherein the at least two port group-specific sets of precoding parameters include a selection of basis components, wherein a number of basis components in a port group-specific set of basis components selected for one CSI-RS port group differs from a number of basis components in another port group-specific set of basis components selected for another CSI-RS port group.

6. The terminal device according to claim 1, wherein at least one TRP of the at least two TRPs has a different number of antenna ports than at least one other TRP of the at least two TRPs.

7. The terminal device according to claim 1, wherein the separate determination of the at least two port group-specific sets of precoding parameters comprises, for at least one domain, a determination of separate matrices, a respective separate matrix indicating basis components for a respective CSI-RS port group for the respective domain.

8. The terminal device according to claim 1, wherein the at least two port group-specific sets of precoding parameters include a selection of frequency-domain basis components, the frequency-domain basis components being based on respective subband eigenvectors determined for each layer, wherein said determining of subband eigenvectors is done before or after a spatial compression.

9. The terminal device according to claim 1, wherein the port group configuration indicates the at least two groups of antenna ports in a CSI-RS resource set comprising a single CSI-RS resource, or wherein the port group configuration indicates the at least two groups of antenna ports in a CSI-RS resource set as being associated to at least two respective CSI-RS resources.

10. The terminal device according to claim 1, wherein each of the at least two port group-specific sets of precoding parameters is determined using CSI-RS measurements of the respective CSI-RS port group only, and wherein a common set of precoding parameters is determined using CSI-RS measurements of the at least two CSI-RS port groups.

11. The terminal device according to claim 1, further comprising means for:

determining a first reference set of basis components for a first reference TRP of the at least two TRPs based on one or more received CSI-RS resources of a first CSI-RS port group of the at least two CSI-RS port groups;

determining a second set of basis components for a second TRP of the at least two TRPs based on one or more received CSI-RS resources of a second CSI-RS port group of the at least two CSI-RS port groups; and determining a cyclic shift value to apply to the first reference set of basis components of the first TRP to derive the second set of basis components of the second TRP.

12. The terminal device according to claim 11, wherein the precoding information of the CSI report transmitted to the network device is indicative of the first reference set of basis components and the cyclic shift value.

13. The terminal device according to claim 11, wherein the first and second port group-specific sets of basis components comprise spatial-domain basis components, frequency-domain basis components and/or time-domain basis components.

14. A network device comprising means for:

transmitting, to a terminal device, a port group configuration indicating at least two groups of antenna ports in a channel state information reference signal, CSI-RS, resource set comprising one or more CSI-RS resources, the at least two CSI-RS port groups being associated with at least two respective transmission reception points, TRPs, using coherent joint transmission, CJT, for downlink, DL, communication, the one or more CSI-RS resources being transmitted from the at least two TRPs with antenna ports belonging to the at least two respective CSI-RS port groups;

receiving, from the terminal device, a CSI report comprising precoding information indicative of at least two port group-specific sets of precoding parameters and a common set of precoding parameters for DL precoding by the at least two respective TRPs, wherein:

the at least two port group-specific sets of precoding parameters are separately determined specifically to the at least two respective CSI-RS port groups; and the common set of precoding parameters are jointly determined across the at least two CSI-RS port groups.

15. The network device of claim 14, further comprising means for:

constructing a precoder at least based on the received precoding information.

16. A method, at least performed by a terminal device, the method comprising:

receiving, from a network device, a port group configuration indicating at least two groups of antenna ports in a channel state information reference signal, CSI-RS, resource set comprising one or more CSI-RS resources, the at least two CSI-RS port groups being associated with at least two respective transmission reception points, TRPs, using coherent joint transmission, CJT, for downlink, DL, communication;

receiving the one or more CSI-RS resources from the at least two TRPs having antenna ports belonging to the at least two respective CSI-RS port groups;

determining, based on the one or more received CSI-RS resources, precoding parameters for DL precoding by the at least two respective TRPs, wherein said determining comprises:

a separate determination of at least two port group-specific sets of precoding parameters specific to the at least two respective CSI-RS port groups; and a joint determination of a common set of precoding parameters across the at least two CSI-RS port groups;

transmitting, to the network device, a CSI report comprising precoding information indicative of the at least two determined port group-specific sets of precoding parameters and the determined common set of precoding parameters.

* * * * *